(12) United States Patent
Tanno et al.

(10) Patent No.: US 11,660,914 B2
(45) Date of Patent: May 30, 2023

(54) PNEUMATIC TIRE

(71) Applicant: The Yokohama Rubber Co., LTD., Tokyo (JP)

(72) Inventors: Atsushi Tanno, Hiratsuka (JP); Hiraku Koda, Hiratsuka (JP); Jun Matsuda, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 111 days.

(21) Appl. No.: 16/768,865

(22) PCT Filed: Nov. 21, 2018

(86) PCT No.: PCT/JP2018/043081
§ 371 (c)(1),
(2) Date: Jun. 1, 2020

(87) PCT Pub. No.: WO2019/107254
PCT Pub. Date: Jun. 6, 2019

(65) Prior Publication Data
US 2021/0221183 A1  Jul. 22, 2021

(30) Foreign Application Priority Data
Jan. 12, 2017 (JP) .............................. JP2017-232074

(51) Int. Cl.
*B60C 15/024* (2006.01)
*B60C 15/04* (2006.01)
(Continued)

(52) U.S. Cl.
CPC .......... *B60C 15/04* (2013.01); *B60C 15/0027* (2013.01); *B60C 15/0054* (2013.01);
(Continued)

(58) Field of Classification Search
CPC ............ B60C 15/0603; B60C 15/0607; B60C 2015/048; B60C 2015/0614;
(Continued)

(56) References Cited

U.S. PATENT DOCUMENTS 4,258,775 A * 3/1981 Samoto ................. B60C 9/2006
152/531
5,524,688 A 6/1996 Trares et al.
(Continued)

FOREIGN PATENT DOCUMENTS

CN   107244193    10/2017
DE   39 36 231 A1  5/1990
(Continued)

OTHER PUBLICATIONS

Machine Translation: JP-02124303-A, Iwamura, Kazumitsu, (Year: 2021).*

(Continued)

*Primary Examiner* — Kendra Ly
(74) *Attorney, Agent, or Firm* — Thorpe North & Western

(57) ABSTRACT

In this pneumatic tire, the bead core has a predetermined wire array structure obtained by arranging wire cross-sections of bead wires in a cross-sectional view in a tire meridian direction. The following are defined in the wire array structure: a tangent line that contacts, from the side of a rim fitting face, an innermost layer in the tire radial direction and the wire cross-section on the innermost side and the outermost side in the tire lateral direction; contact points of the tangent line with respect to the wire cross-sections on the innermost side and the outermost side; a middle point of the contact points; and gauges in the tire radial direction from the contact points and middle point to
(Continued)

the rim fitting face. In this case, the change rates of the gauges before and after rim assembly each are in the range of 10% to 60%.

19 Claims, 20 Drawing Sheets

(51) Int. Cl.
  *B60C 15/06* (2006.01)
  *B60C 15/00* (2006.01)
  *B60C 5/14* (2006.01)
(52) U.S. Cl.
  CPC ........ *B60C 15/0072* (2013.01); *B60C 15/024* (2013.01); *B60C 15/06* (2013.01); *B60C 5/14* (2013.01); *B60C 2015/009* (2013.01); *B60C 2015/0245* (2013.01); *B60C 2015/048* (2013.01); *B60C 2015/0614* (2013.01); *B60C 2015/0621* (2013.01); *B60C 2015/0625* (2013.01)
(58) Field of Classification Search
  CPC ...... B60C 2015/009; B60C 2015/0617; B60C 2015/0625; B60C 15/04; B60C 15/024; B60C 15/06
  See application file for complete search history.

(56) References Cited

U.S. PATENT DOCUMENTS

| | | | |
|---|---|---|---|
| 2006/0272761 | A1 | 12/2006 | Nakamura |
| 2010/0089513 | A1 | 4/2010 | Sasaki |
| 2013/0240107 | A1* | 9/2013 | Ebiko ................ B60C 15/0603 152/541 |
| 2016/0152792 | A1* | 6/2016 | Kunisawa ................ C08K 3/36 524/493 |
| 2018/0134097 | A1* | 5/2018 | Isaka ..................... B60C 15/024 |

FOREIGN PATENT DOCUMENTS

| | | | | | |
|---|---|---|---|---|---|
| JP | 63149207 | A | * | 6/1988 | |
| JP | 02124303 | A | * | 5/1990 | ............ B60C 15/04 |
| JP | 03125612 | A | * | 5/1991 | ............ B60C 15/06 |
| JP | H07-032824 | | | 2/1995 | |
| JP | 10181318 | A | * | 7/1998 | |
| JP | 2000-309210 | | | 11/2000 | |
| JP | 2002200905 | A | * | 7/2002 | |
| JP | 2002-301915 | | | 10/2002 | |
| JP | 2008068831 | A | * | 3/2008 | |
| JP | 2008-149778 | | | 7/2008 | |
| JP | 2009-274477 | | | 11/2009 | |
| JP | 2009274477 | A | * | 11/2009 | |
| JP | 2012-162204 | | | 8/2012 | |
| JP | 2013-052720 | | | 3/2013 | |
| JP | 2013-063679 | | | 4/2013 | |
| JP | 2015089784 | A | * | 5/2015 | |
| WO | WO 2005/025897 | | | 3/2005 | |
| WO | WO 2007/015341 | | | 2/2007 | |

OTHER PUBLICATIONS

Machine Translation: JP-63149207-A, Minetani, Kazuyoshi, (Year: 2021).*
Machine Translation: JP-10181318-A, Hayashi, Kazuo, (Year: 2021).*
Machine Translation: JP-03125612-A, Shimomura, Iwao, (Year: 2021).*
Machine Translation: JP-2002200905-A, Mori, Koji, (Year: 2021).*
Machine Translation: JP-2009274477-A, Nemoto, Masayuki, (Year: 2021).*
Machine Translation: JP-2015089784-A, Akabori Y, (Year: 2022).*
Machine Translation: JP-2008068831-A, Takahashi H, (Year: 2022).*
International Search Report for International Application No. PCT/JP2018/043081 dated Dec. 25, 2018, 4 pages, Japan.

* cited by examiner

| | CONVENTIONAL EXAMPLE | COMPARATIVE EXAMPLE 1 | COMPARATIVE EXAMPLE 2 | EXAMPLE 1 | EXAMPLE 2 | EXAMPLE 3 | EXAMPLE 4 |
|---|---|---|---|---|---|---|---|
| BEAD FILLER | NO | NO | NO | NO | NO | NO | NO |
| RUBBER OCCUPANCY RATIO IN CLOSED REGION X (%) | 2.0 | 18.0 | 20.0 | 2.0 | 1.0 | 1.0 | 1.0 |
| WIRE ARRAY STRUCTURE | FIG. 15 | FIG. 4 | FIG. 4 | FIG. 4 | FIG. 4 | FIG. 4 | FIG. 4 |
| G1 (mm) | 3.5 | 3.4 | 3.6 | 3.0 | 3.2 | 3.4 | 4.7 |
| Gm (mm) | 3.2 | 3.2 | 3.2 | 2.6 | 2.7 | 3.0 | 3.7 |
| G2 (mm) | 2.9 | 2.9 | 2.9 | 2.4 | 2.6 | 2.7 | 2.8 |
| G1' (mm) | 3.2 | 3.2 | 3.2 | 2.6 | 2.6 | 2.2 | 2.6 |
| Gm' (mm) | 3.0 | 2.9 | 2.8 | 2.3 | 2.3 | 2.1 | 2.4 |
| G2' (mm) | 2.8 | 2.8 | 2.7 | 2.0 | 2.1 | 2.0 | 2.0 |
| ΔG1 (%) | 8.6 | 5.9 | 11.1 | 13.3 | 18.8 | 35.3 | 44.7 |
| ΔGm (%) | 6.3 | 9.4 | 12.5 | 11.5 | 14.8 | 30.0 | 35.1 |
| ΔG2 (%) | 3.4 | 3.4 | 6.9 | 16.7 | 19.2 | 25.9 | 28.6 |
| ΔG1 − ΔGm (%) | 2.3 | −3.5 | −1.4 | 1.8 | 3.9 | 5.3 | 9.5 |
| ΔGm − ΔG2 (%) | 2.8 | 5.9 | 5.6 | −5.1 | −4.4 | 4.1 | 6.6 |
| \|(ΔG1 − ΔGm)/(ΔGm − ΔG2)\| | 82.9 | 58.9 | 24.8 | 35.0 | 89.1 | 129.9 | 145.4 |
| Dt (mm) | 4.0 | 4.1 | 4.0 | 3.5 | 3.8 | 3.8 | 5.0 |
| Wt (mm) | 4.3 | 4.4 | 3.6 | 4.2 | 4.5 | 4.5 | 4.6 |
| arctan {(Dt − G1)/Wt} (deg) | 15.0 | 9.0 | 6.3 | 6.8 | 7.6 | 5.1 | 3.7 |
| Wh (mm) | 5.8 | 5.7 | 5.0 | 5.0 | 5.0 | 5.0 | 5.0 |
| φ (mm) | 1.2 | 1.2 | 1.2 | 1.2 | 1.2 | 1.2 | 1.2 |
| G2/φ | 1.5 | 2.4 | 2.4 | 2.0 | 2.2 | 2.3 | 2.3 |
| Wh/φ | 2.0 | 4.8 | 4.2 | 4.2 | 4.2 | 4.2 | 4.2 |
| TIRE MASS | 100 | 101 | 102 | 99 | 99 | 98 | 99 |
| RIM FITTABILITY | 100 | 95 | 105 | 110 | 115 | 120 | 125 |

FIG. 18A

| | EXAMPLE 5 | EXAMPLE 6 | EXAMPLE 7 | EXAMPLE 8 | EXAMPLE 9 | EXAMPLE 10 | EXAMPLE 11 | EXAMPLE 12 | EXAMPLE 13 |
|---|---|---|---|---|---|---|---|---|---|
| BEAD FILLER | NO | NO | NO | NO | NO | NO | NO | NO | NO |
| RUBBER OCCUPANCY RATIO IN CLOSED REGION X (%) | 1.0 | 1.0 | 1.0 | 1.0 | 1.0 | 1.0 | 1.0 | 1.0 | 1.0 |
| WIRE ARRAY STRUCTURE | FIG. 4 | FIG. 4 | FIG. 4 | FIG. 4 | FIG. 4 | FIG. 4 | FIG. 4 | FIG. 4 | FIG. 4 |
| G1 (mm) | 3.2 | 3.4 | 4.7 | 4.7 | 4.7 | 4.8 | 4.7 | 4.7 | 4.7 |
| Gm (mm) | 2.7 | 3.0 | 3.7 | 3.7 | 3.7 | 3.8 | 3.9 | 3.6 | 3.7 |
| G2 (mm) | 2.6 | 2.7 | 2.8 | 2.8 | 2.8 | 2.8 | 2.8 | 2.9 | 2.7 |
| G1' (mm) | 2.6 | 2.2 | 2.6 | 2.6 | 2.6 | 2.6 | 2.6 | 2.6 | 2.6 |
| Gm (mm) | 2.2 | 2.1 | 2.4 | 2.4 | 2.4 | 2.4 | 2.4 | 2.4 | 2.4 |
| G2' (mm) | 2.1 | 2.0 | 2.0 | 2.0 | 2.0 | 2.0 | 2.0 | 2.0 | 2.0 |
| ΔG1 (%) | 18.8 | 35.3 | 44.7 | 44.7 | 44.7 | 45.8 | 44.7 | 44.7 | 44.7 |
| ΔGm (%) | 18.5 | 30.0 | 35.1 | 35.1 | 35.1 | 36.8 | 38.5 | 33.3 | 35.1 |
| ΔG2 (%) | 19.2 | 25.9 | 28.6 | 28.6 | 28.6 | 28.6 | 28.6 | 31.0 | 25.9 |
| ΔG1 - ΔGm (%) | 0.2 | 5.3 | 9.5 | 9.5 | 9.5 | 9.0 | 6.2 | 11.3 | 9.5 |
| ΔGm - ΔG2 (%) | -0.7 | 4.1 | 6.6 | 6.6 | 6.6 | 8.3 | 9.9 | 2.3 | 9.2 |
| \|(ΔG1 - ΔGm)/(ΔGm - ΔG2)\| | 32.5 | 129.9 | 145.4 | 145.4 | 145.4 | 108.7 | 62.9 | 493.6 | 103.7 |
| Dt (mm) | 4.8 | 4.7 | 5.8 | 6.1 | 6.2 | 5.9 | 6.4 | 6.4 | 5.6 |
| Wt (mm) | 4.4 | 3.7 | 3.5 | 2.9 | 3.2 | 2.8 | 3.5 | 3.1 | 4.2 |
| arctan {(Dt - G1)Wt} (deg) | 20.0 | 19.4 | 17.4 | 25.8 | 25.1 | 21.4 | 25.9 | 28.7 | 12.1 |
| Wh (mm) | 4.0 | 3.0 | 3.0 | 3.0 | 3.0 | 2.8 | 2.9 | 2.8 | 2.7 |
| φ (mm) | 1.2 | 1.2 | 1.2 | 1.2 | 1.2 | 1.3 | 1.3 | 1.3 | 1.3 |
| G2/φ | 2.2 | 2.3 | 2.3 | 2.3 | 2.3 | 2.2 | 2.2 | 2.2 | 2.1 |
| Wh/φ | 3.3 | 2.5 | 2.5 | 2.5 | 2.5 | 2.2 | 2.2 | 2.2 | 2.1 |
| TIRE MASS | 98 | 98 | 98 | 98 | 98 | 99 | 99 | 99 | 98 |
| RIM FITTABILITY | 105 | 115 | 115 | 120 | 120 | 115 | 115 | 115 | 115 |

FIG. 18B

CONVENTIONAL EXAMPLE

PNEUMATIC TIRE

TECHNICAL FIELD

The technology relates to a pneumatic tire, and particularly relates to a pneumatic tire that can ensure a rim fittability of a tire while reducing a weight of the tire.

BACKGROUND ART

In order to reduce the weight of a tire, the weight reduction of a bead portion has been recently advanced. A conventional pneumatic tire related to the above demand is described in Japan Unexamined Patent Publication No. 2008-149778, in which the weight of the tire is reduced by omitting a bead filler. However, in this conventional pneumatic tire, the rim fittability may deteriorate due to the omission of the bead filler.

SUMMARY

The present technology provides a pneumatic tire that can ensure the rim fittability of the tire while reducing the weight of the tire.

A pneumatic tire according to the present technology includes: a bead core formed of one or more bead wires wound in a ring-like and multiple manner; a carcass layer formed of one or more carcass plies, the carcass layer being turned back to wrap around the bead core and extending across the bead core; and a rim cushion rubber disposed along a turned-back portion of the carcass layer to constitute a rim fitting face of a bead portion, wherein the bead core has a predetermined wire array structure formed by arranging a wire cross-section of the bead wire in a cross-sectional view in a tire meridian direction, the following in the wire array structure are defined: a tangent line L1 that contacts, from a side of the rim fitting face, an innermost layer in a tire radial direction and innermost and outermost wire cross-sections in a tire lateral direction; contact points C1, C2 on the tangent line L1, a middle point Cm of the contact points C1, C2; and gauges G1, G2, and Gm in the tire radial direction from the contact points C1, C2 and the middle point Cm to the rim fitting face, and change rates $\Delta G1$, $\Delta G2$, and $\Delta Gm$ of the gauges G1, G2, and Gm before and after rim assembly each are in a range of 10% to 60%.

In the pneumatic tire according to the present technology, change rates $\Delta G1$, $\Delta G2$, and $\Delta Gm$ of the rim fitting portion of the bead portion can be advantageously made appropriate. That is, the above-mentioned lower limit ensures the rim fitting pressure to ensure the rim fittability of the tire. Additionally, the above-mentioned upper limit suppresses the degradation of the tire rim assembling workability due to an excessive rim fitting pressure.

BRIEF DESCRIPTION OF DRAWINGS

FIGS. 18A-18B include a table showing the results of performance tests of pneumatic tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency with the technology, and obviously substitutable elements. Furthermore, the modified examples described in the embodiments can be combined as desired within the scope apparent to one skilled in the art.

Pneumatic Tire

Figure 1:
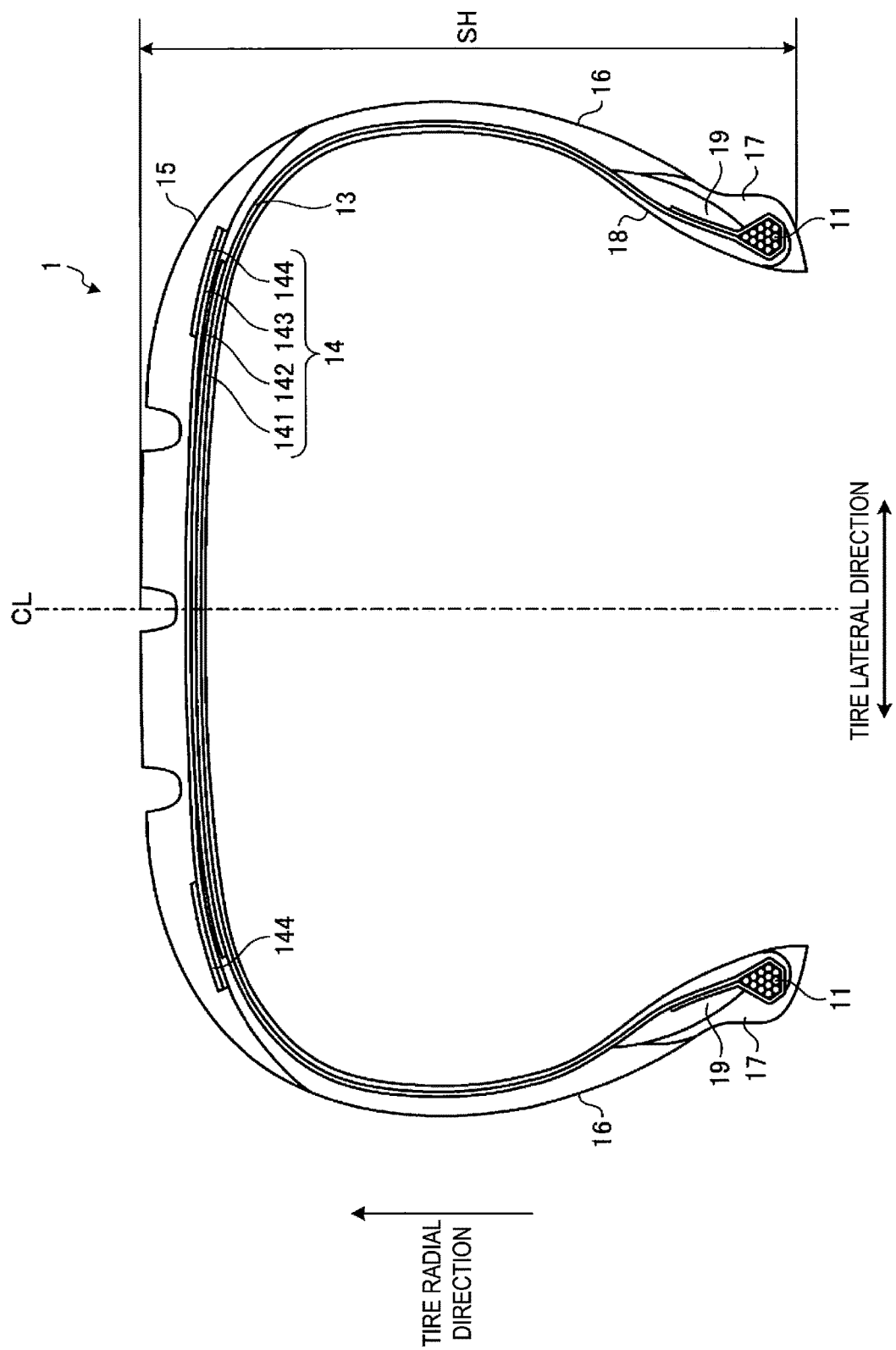
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The same drawing illustrates a cross-sectional view of a half region in the tire radial direction. Also, the same drawing illustrates a radial tire for a passenger vehicle as an example of a pneumatic tire.

In reference to the same drawing, "cross section in a tire meridian direction" refers to a cross section of the tire taken along a plane that includes the tire rotation axis (not illustrated). Reference sign CL denotes the tire equatorial plane and refers to a plane normal to the tire rotation axis that passes through the center point of the tire in the tire rotation axis direction. "Tire lateral direction" refers to the direction parallel with the tire rotation axis. "Tire radial direction" refers to the direction perpendicular to the tire rotation axis.

A pneumatic tire 1 has a ring-like structure around the tire rotation axis, and includes a pair of bead cores 11, 11, a carcass layer 13, a belt layer 14, a tread rubber 15, a pair of sidewall rubbers 16, 16, a pair of rim cushion rubbers 17, 17, and an innerliner 18 (see FIG. 1).

The pair of bead cores 11, 11 are formed by winding one or more bead wires made of steel in a ring-like and multiple manner, and are embedded in respective bead portions to constitute cores of the left and right bead portions.

The carcass layer 13 has a monolayer structure formed of one carcass ply or a multilayer structure formed of a plurality of laminated carcass plies, and extends between the left and right bead cores 11, 11 into a toroidal shape to form the framework of the tire. Additionally, both ends of the carcass layer 13 are turned back toward the outside in the tire lateral direction so as to wrap around the bead cores 11, and are locked. The carcass ply of the carcass layer 13 is configured by coating a plurality of carcass cords made of steel or an organic fiber material (e.g. aramid, nylon, polyester, rayon, or the like) with coating rubber and rolling the coated carcass codes, and has a carcass angle (defined as the inclination angle of the carcass cord in the longitudinal direction with respect to the tire circumferential direction) in a range of 80° to 90° as an absolute value. In the configuration illustrated in FIG. 1, the carcass layer 13 has a monolayer structure formed of a single carcass ply. However, the carcass layer 13 may have a multilayer structure formed of a plurality of laminated carcass plies.

The belt layer 14 is formed by laying a pair of cross belts 141, 142, a belt cover 143, and a pair of belt edge covers 144, and is wound around the outer periphery of the carcass layer 13. The pair of cross belts 141, 142 are made by performing a rolling process on coating rubber-covered belt cords made of steel or an organic fiber material. The cross belts 141, 142 have a belt angle, as an absolute value, in a range of 20° to 55°. Furthermore, the pair of cross belts 141, 142 have belt angles of opposite signs (defined as inclination angles of the belt cords in the longitudinal direction with respect to the tire circumferential direction), and are laid such that the longitudinal directions of the belt cords intersect each other (so-called cross-ply structure). The belt cover 143 and the pair of belt edge covers 144 are configured by coating a belt cover cord made of steel or an organic fiber material with a coating rubber, and the cross belts have a belt angle in a range of 0° to 10° as an absolute value. Further, for example, the belt cover 143 and the pair of belt edge covers 144 each are configured by winding a strip material, which is formed by coating one or more belt cover cords with a coating rubber, around the outer circumferential faces of the cross belts 141, 142 in the tire circumferential direction, in a spiral and multiple manner.

The tread rubber 15 is disposed toward the outside of the carcass layer 13 and the belt layer 14 in the tire radial direction and constitutes a tread portion. The pair of sidewall rubbers 16, 16 are disposed toward the outside of the carcass layer 13 in the tire lateral direction and constitute left and right sidewall portions. The pair of rim cushion rubbers 17, 17 are disposed on the inner side of the tire radial inner direction of the left and right bead cores 11, 11 and the turned-back portions of the carcass layer 13, to constitute rim fitting faces of the bead portions.

The innerliner 18 is an air permeation preventing layer that is disposed on the tire cavity face and covers the carcass layer 13, thereby suppressing oxidation caused by exposure of the carcass layer 13 and preventing a leakage of air filled in the tire. In addition, the innerliner 18 is constituted by, for example, a rubber composition with butyl rubber as a main component, thermoplastic resin, thermoplastic elastomer composition made by blending an elastomer component with a thermoplastic resin, and the like. The innerliner 18 is adhered to the carcass layer 13 via a tie rubber (not illustrated).

Bead Fillerless Structure

Figure 2:
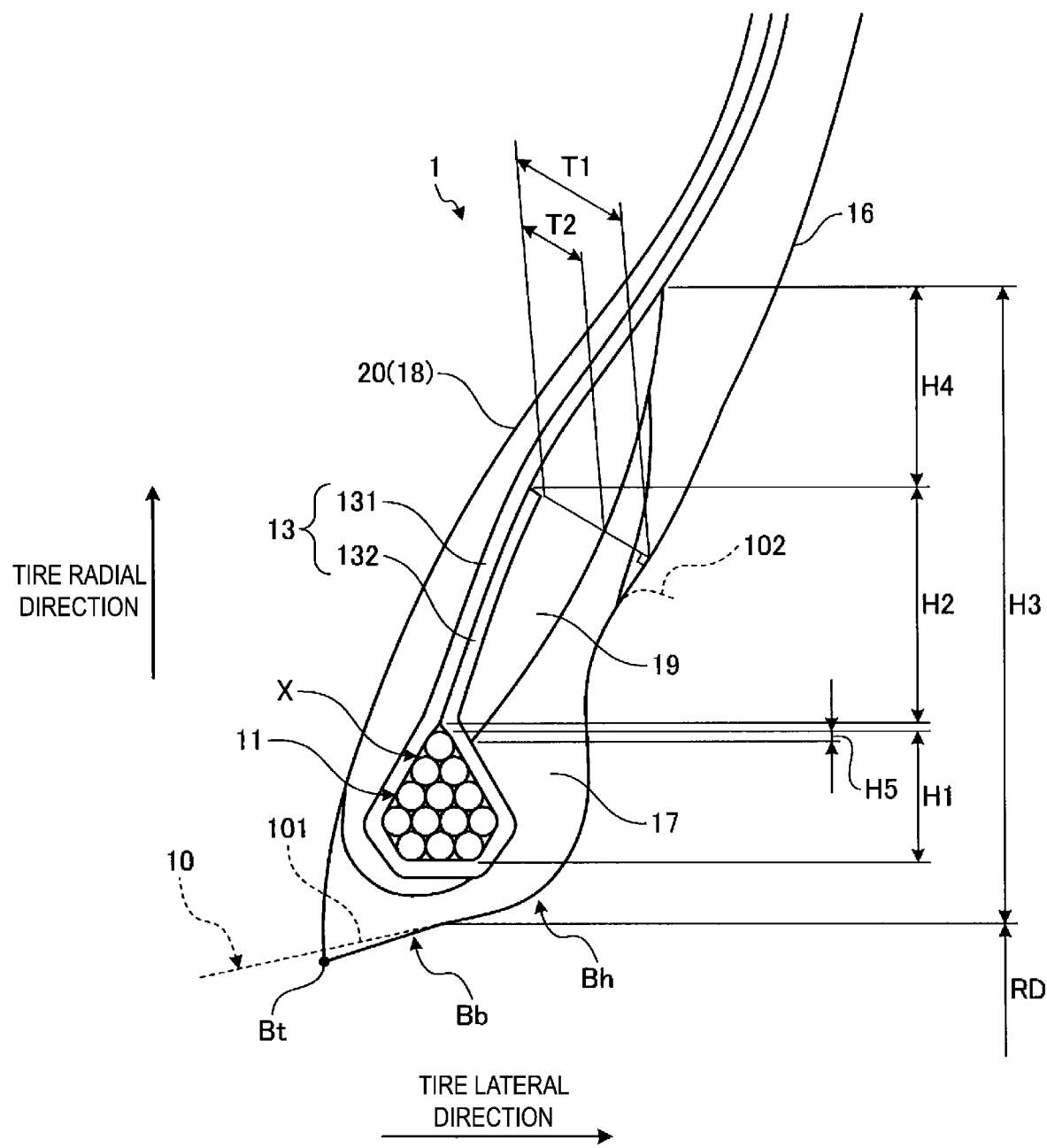
FIG. 2 is a cross-sectional view illustrating a bead portion of the pneumatic tire illustrated in FIG. 1.

FIG. 2 is a cross-sectional view illustrating the bead portion of the pneumatic tire illustrated in FIG. 1. This figure is the cross-sectional view in the tire meridian direction illustrating the bead portion of the tire in the state before rim assembly.

As illustrated in FIG. 2, the carcass layer 13 is turned back toward the outside in the tire lateral direction so as to wrap around the bead cores 11, and is locked. In this case, a turned-back portion 132 of the carcass layer 13 contacts a body portion 131 to form a closed region X that surrounds the bead core 11. In addition, the closed region X continues over the entire circumference of the tire to form a ring-like closed space that surrounds the bead core 11.

The closed region X is defined as a region surrounded with the carcass ply of the carcass layer 13, in the cross-sectional view in the tire meridian direction. Specifically, the region enclosed with the surface of the coat rubber of the carcass ply is defined as the closed region X.

Also, in the configuration illustrated in FIG. 2, the carcass layer 13 is constituted of a monolayer carcass ply, and self-contact of the carcass ply forms the closed region X. On the other hand, in the configuration in which the carcass layer 13 is formed of a plurality of laminated carcass plies (not illustrated), mutual contact of different carcass plies may form the closed region X. For example, although not illustrated, it is assumed that the carcass layer 13 has a two-layer structure formed by laminating first and second carcass plies, a turned-back portion of the first carcass ply terminates in the middle of a height H1 in the tire radial direction of the bead core 11 without contacting a body portion (see FIG. 2), and a turned-back portion of the second carcass ply extends to the radial outer side of the bead core 11 and contacts the body portion of the first carcass ply (not illustrated).

In this case, the rubber occupancy ratio in the closed region X is preferably 15% or less, more preferably 10% or less, and even more preferably 5% or less. Accordingly, the rubber occupancy ratio in the closed region X surrounded with the body portion 131 and the turned-back portion 132 of the carcass layer 13, that is, the rubber volume around the bead core 11, is set to be very low. As a result, the purpose of reducing the weight of the tire is achieved by omitting the bead filler. Note that the lower limit of the rubber occupancy ratio is not particularly limited but is preferably 0.1% or more.

The rubber occupancy ratio is calculated as the ratio % of the cross-sectional area of the rubber material in the closed region X to the overall cross-sectional area of the closed region X, in the cross-sectional view in the tire meridian direction.

For example, in the configuration illustrated in FIG. 2, the turned-back portion 132 of the carcass layer 13 is turned back to contact the body portion 131, without the bead filler included in the closed region X. Also, the carcass ply of the carcass layer 13 is wound up along the outer peripheral face of the bead core 11. Thus, only components of the bead core 11 are present in the closed region X. The components of the bead core 11 include bead wires 111, an insulation rubber, a bead cover, and wrapping threads.

Note that the bead filler is a reinforcing rubber that fills a triangular gap between the bead core, and the body portion and the turned-back portion of the carcass layer, and is disposed to increase the rigidity of the bead portion. The bead filler generally has a triangular cross-section, and has a rubber hardness in a range of 65 to 99.

The rubber hardness is measured in accordance with JIS (Japanese Industrial Standard) K 6253.

Additionally, in the above-mentioned configuration including no bead filler, as illustrated in FIG. 2, the turned-back portion 132 of the carcass layer 13 is preferably locked in surface-contact with the body portion 131 of the carcass layer 13. Additionally, a height H2 in the tire radial direction of the contact portion between the body portion 131 and the turned-back portion 132 of the carcass layer 13 and a height H1 in the tire radial direction of the bead core 11 preferably have a relationship 0.80≤H2/H1≤3.00, and more preferably a relationship 1.20≤H2/H1≤2.50. As a result, the height H2 in the tire radial direction of the self-contact portion of the carcass layer 13 is made appropriate. In other words, the above-mentioned lower limit allows the turned-back portion 132 to stably contact the body portion 131 to improve the durability of the bead portion. In addition, the upper limit suppresses an increase in the weight of the tire due to an excessive amount of the turned-back portion 132.

The height H1 in the tire radial direction of the bead core is measured as a maximum height in the tire radial direction in the wire array structure of the bead core, from the innermost layer in the tire radial direction and the inner end in the tire lateral direction of the outermost wire cross-section in the tire radial direction to the outermost layer in the tire radial direction and the outer end in the tire radial direction of the outermost wire cross-section in the tire lateral direction.

The height H2 in the tire radial direction of the self-contact portion of the carcass layer is measured as a maximum length of the contact portion between the body portion and the turned-back portion of the carcass layer in the tire radial direction.

Additionally, in the configuration described above, as illustrated in FIG. 2, an end (reference sign is omitted in the figure) of the turned-back portion 132 of the carcass layer 13 preferably contacts the body portion 131 of the carcass layer 13. In such a configuration, as compared to the configuration in which the end of the turned-back portion 132 is spaced from the body portion 131 (not illustrated), stress concentration at the end of the turned-back portion 132 is relieved. As a result, separation of the peripheral rubber from the end of the turned-back portion 132 is suppressed.

Additionally, an actual length La2 (dimension symbols are omitted in the figure) of the contact portion between the body portion 131 and the turned-back portion 132 of the carcass layer 13 and a circumferential length La1 (dimension symbols are omitted in the figure) of the closed region X preferably have a relationship 0.30≤La2/La1≤2.00, and more preferably a relationship 0.37≤La2/La1≤1.80. As a result, the actual length La2 of the self-contact portion of the carcass layer 13 is made appropriate. That is, the above-mentioned lower limit appropriately ensures the spring characteristics of the carcass layer 13, the steering stability on dry road faces, and the durability of the bead portion. In addition, the upper limit suppresses an increase in the weight of the tire due to an excessive amount of the turned-back portion 132.

The circumferential length La1 of the closed region X is measured as a periphery length of the surface of the carcass ply that constitutes the boundary line of the closed region X, in a cross-sectional view in the tire meridian direction.

The actual length La2 of the contact portion is measured as a periphery length at the self-contact portion between the body portion and the turned-back portion of the carcass layer, in a cross-sectional view in the tire meridian direction.

Note that, in the configuration illustrated in FIG. 2, as described above, the pneumatic tire 1 includes no bead filler. However, no such limitation is intended, and the pneumatic tire 1 may include the bead filler or other reinforcing rubber between the body portion and the turned-back portion of the carcass layer (see FIG. 17 described below).

[Outer Reinforcing Rubber]

As illustrated in FIG. 2, the pneumatic tire 1 includes the outer reinforcing rubbers 19 in addition to the sidewall rubbers 16 and the rim cushion rubbers 17 described above.

The sidewall rubber 16 is disposed on the outer side of the carcass layer 13 in the tire lateral direction to constitute sidewall portions of the tire. Additionally, the rubber hardness of the sidewall rubber 16 is in a range of 40 to 70. Furthermore, the elongation at break of the sidewall rubber 16 is in a range of 400% to 650%.

The elongation at break is measured in accordance with JIS K6251.

As described above, the rim cushion rubber 17 is disposed on the inner side of the bead core 11 and the turned-back portion 132 of the carcass layer 13 in the tire radial direction to constitute the rim fitting face of the bead portion. Additionally, the rubber hardness of the rim cushion rubber 17 is in a range of 50 to 80. Further, the elongation at break of the rim cushion rubber 17 is in a range of 150% to 450%.

The outer reinforcing rubber 19 is disposed between the turned-back portion 132 of the carcass layer 13 and the rim cushion rubber 17 (see FIG. 2). In such a configuration, in particular, in the configuration including no bead filler, the spring characteristics of the bead portion is reinforced by the outer reinforcing rubber 19, thereby ensuring the steering stability on dry road faces and improving the durability of the bead portion.

Furthermore, the rubber hardness of the outer reinforcing rubbers 19 is preferably in a range of 65 to 105, and more preferably in a range of 70 to 100. As a result, the above-mentioned effects of the outer reinforcing rubbers 19 are appropriately ensured.

Additionally, the rubber hardness of the outer reinforcing rubber 19 is higher than the rubber hardness of the sidewall rubber 16 and the rim cushion rubber 17. Specifically, a difference ΔHs_SW between the rubber hardness of the sidewall rubber 16 and the rubber hardness of the outer reinforcing rubber 19 is preferably 7 or more, and more preferably 12 or more. Additionally, a difference ΔHs_RC between the rubber hardness of the rim cushion rubber 17 and the rubber hardness of the outer reinforcing rubber 19 is preferably 3 or more, and more preferably 7 or more. As a result, the reinforcing effect of the spring characteristics of the bead portions caused by the outer reinforcing rubbers 19 is appropriately exhibited. Note that the lower limit of the rubber hardness difference ΔHs_SW is limited by the lower limit of the rubber hardness of the above-described outer reinforcing rubbers 19.

Furthermore, the elongation at break of the outer reinforcing rubber 19 is preferably in a range of 50% to 400%, and more preferably in a range of 70% to 350%.

For example, in the configuration illustrated in FIG. 2, the rim cushion rubber 17 extends over the entire region from a bead toe Bt to a bead base Bb to form a rim fitting face with respect to a bead seat 101 of the rim 10. Additionally, the rim cushion rubber 17 extends from the bead base Bb toward the outer side in the tire radial direction along the turned-back portion 132 of the carcass layer 13 to form the fitting face into a flange 102 of the rim 10. Additionally, an outer end of the rim cushion rubber 17 in the tire radial direction is inserted between the carcass layer 13 and the sidewall rubber 16, and extends further to the outer side in the tire radial direction than the end of the turned-back portion 132 of the carcass layer 13 and the flange 102 of the rim 10. Additionally, the bead portion may include a chafer (not illustrated).

Note that the rim cushion rubber 17 preferably extends at least in a region from a bead heel Bh to a central portion (a middle point Cm described below) in the innermost layer of the bead core 11 in the tire radial direction. As a result, the durability of the rim fitting portion of the bead portion is appropriately ensured.

Additionally, in the configuration illustrated in FIG. 2, the outer reinforcing rubber 19 is long in the tire radial direction, and is sandwiched between the turned-back portion 132 of the carcass layer 13 and the rim cushion rubber 17. Additionally, the inner end of the outer reinforcing rubber 19 in the tire radial direction overlaps the bead core 11 in the tire radial direction. Additionally, the outer reinforcing rubber 19 extends farther to the outer side in the tire radial direction than the end of the turned-back portion 132 of the carcass layer 13, and is sandwiched between the body portion 131 of the carcass layer 13 and the sidewall rubber 16. Additionally, the outer reinforcing rubber 19 covers the end of the turned-back portion 132 of the carcass layer 13 from the outer side in the tire lateral direction. Additionally, the outer reinforcing rubber 19 is adjacent to the turned-back portion 132 of the carcass layer 13 over the entire region of the contact portion between the body portion 131 and the turned-back portion 132 of the carcass layer 13. As a result, the spring characteristics of the bead portion are appropriately reinforced by the outer reinforcing rubber 19, thereby improving the steering stability on dry road faces and the durability of the bead portion. Additionally, since the rubber hardness of the outer reinforcing rubber 19 is higher than the rubber hardness of the sidewall rubber 16 and the rim cushion rubber 17, the distribution of the rubber hardness in the vicinity of the end of the turned-back portion 132 of the carcass layer 13 decreases from the end of the carcass layer 13 toward the surface of the tire side portion. As a result, a stress generated in the vicinity of the end of the carcass layer 13 is relieved to suppress separation of the peripheral rubber.

Additionally, a height H3 in the tire radial direction from a measurement point of a tire inner diameter RD to an outer end of the outer reinforcing rubber 19 in the tire radial direction, and a tire cross-sectional height SH (see FIG. 1) preferably have a relationship $0.10 \leq H3/SH \leq 0.60$, and more preferably a relationship $0.15 \leq H3/SH \leq 0.50$. As a result, the height H3 in the tire radial direction of the outer reinforcing rubber 19 is made appropriate. That is, the above-mentioned lower limit appropriately reinforces the spring characteristics of the bead portion with the outer reinforcing rubber 19, thereby improving the steering stability on dry road faces and the durability of the bead portion. In addition, the upper limit suppresses an increase in the weight of the tire due to an excessive amount of the outer reinforcing rubber 19.

The tire inner diameter RD is equal to the rim diameter of a specified rim.

The height H3 in the tire radial direction is measured when the tire is mounted on the specified rim, inflated to a specified internal pressure, and in an unloaded state. Specifically, this height is calculated as a difference between the diameter of the outer end of the outer reinforcing rubber 19 in the tire radial direction, and the tire inner diameter RD.

The tire cross-sectional height SH of the tire is a distance of a half of the difference between the tire outer diameter and the rim diameter, and is measured when the tire is mounted on the specified rim, inflated to the specified internal pressure, and in the unloaded state.

"Specified rim" refers to an "applicable rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). Additionally, "specified internal pressure" refers to a "maximum air pressure" defined by JATMA, to the maximum value in "TIRE LOAD LIMITS AT VARIOUS COLD INFLATION PRESSURES" defined by TRA, and to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in the case of JATMA, for a passenger vehicle tire, the specified internal pressure is an air pressure of 180 (kPa), and the specified load is 88% of the maximum load capacity.

Additionally, a height H4 in the tire radial direction from the end of the turned-back portion 132 of the carcass layer 13 to the outer end of the outer reinforcing rubber 19 in the tire radial direction, and the height H2 in the tire radial direction of the contact portion between the body portion 131 and the turned-back portion 132 of the carcass layer 13 preferably have a relationship $0.10 \leq H4/H2$, and more preferably a relationship $0.30 \leq H4/H2$. As a result, the steering stability on dry road faces and the durability of the bead portion are improved. Note that the upper limit of the ratio H4/H2 is limited by the upper limit of the ratio H3/SH described above.

Additionally, an overlap amount H5 in the tire radial direction of the outer reinforcing rubber 19 and the bead core 11, and the height H1 in the tire radial direction of the bead core 11 preferably have a relationship $0.05 \leq H5/H1 \leq 1.00$, and more preferably a relationship $0.10 \leq H5/H1 \leq 1.00$. In addition, the overlap amount H5 is preferably in a range of $5.0 \text{ mm} \leq H5$. As a result, the overlap amount H5 of the outer reinforcing rubber 19 and the bead core 11 is made appropriate. In particular, the above-mentioned lower limit ensures the overlap amount H5, thereby suppressing separation of rubber at the inner end of the outer reinforcing rubber 19 in the tire radial direction.

The overlap amount H5 is measured when the tire is mounted on the specified rim, inflated to the specified internal pressure, and in the unloaded state.

Note that, without being limited to the above, the outer reinforcing rubber 19 may be disposed on the outer side of the bead core 11 in the tire radial direction (not illustrated).

Additionally, a length T1 of a perpendicular line drawn from the end of the turned-back portion 132 of the carcass layer 13 to the outer face of the tire side portion, and a thickness T2 of the outer reinforcing rubber 19 on the perpendicular line preferably have a relationship $0.10 \leq T2/T1 \leq 0.90$, and more preferably a relationship $0.20 \leq T2/T1 \leq 0.80$. As a result, the thickness T2 of the outer reinforcing rubber 19 is made appropriate. That is, the above-mentioned lower limit appropriately reinforces the spring characteristics of the bead portion with the outer reinforcing rubber 19, thereby improving the steering stability on dry road faces and the durability of the bead portion. In addition, the upper limit suppresses an increase in the weight of the tire due to an excessive amount of the outer reinforcing rubber 19.

In addition, in the configuration including the outer reinforcing rubbers 19 instead of the bead filler as described above, a numerical value K defined by a below-mentioned mathematical expression (1) satisfies preferably $0.17 \leq K$, and more preferably 0.20≤K. As a result, the function of the outer reinforcing rubber 19 is appropriately ensured. In the mathematical expression (1), W is a tire nominal width (mm), I is a tire nominal inner diameter (inch), and B is a total cross-sectional area of the bead wire in the bead core (mm$^2$).

Mathematical Formula 1

$$K = \frac{W^{\frac{4}{3}} \times I^{\frac{2}{3}}}{100 \times B^2}$$ Mathematical Formula 1

Change Rate of Rim Fitting Portion

In the above-described configurations including no bead filler, the rigidity of the bead portions is reduced, and the rim fitting pressure of the bead portions tends to decrease. Therefore, in the configuration illustrated in FIG. 2, in order to ensure the rim fittability of the tire, the bead core 11 has a following configuration.

Figure 3:
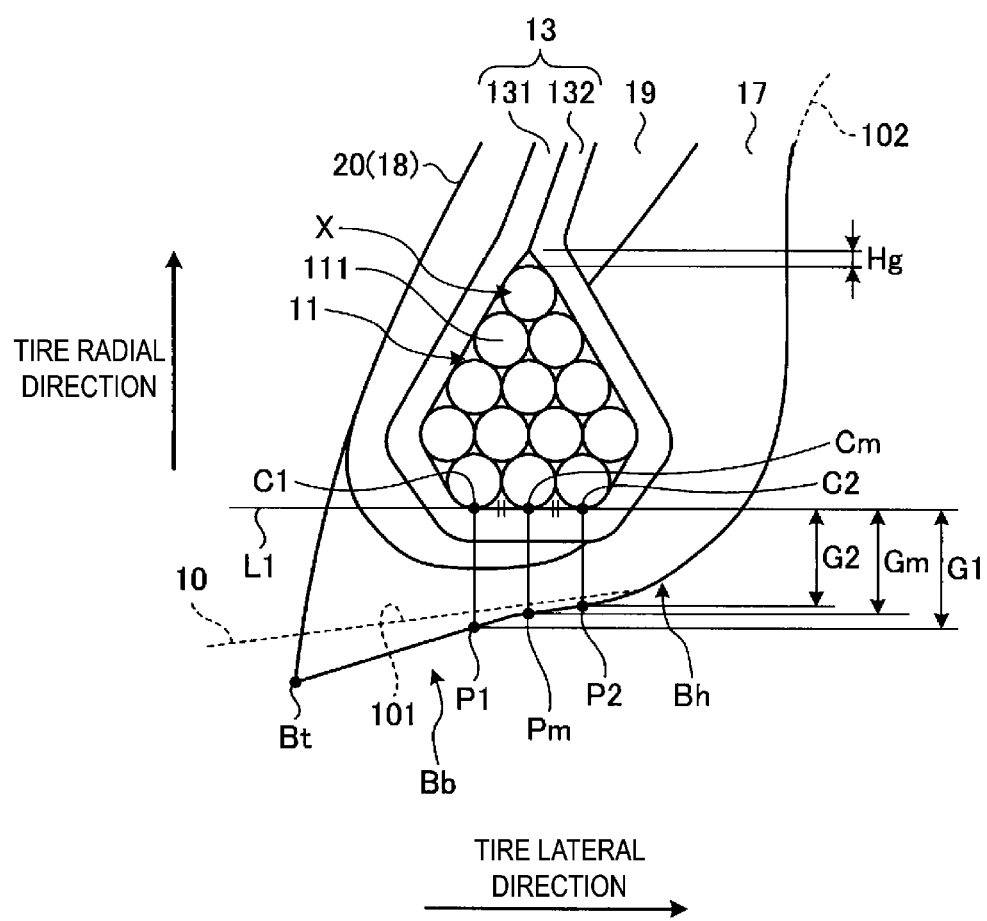
FIG. 3 is an enlarged view illustrating a rim fitting portion of the bead portion illustrated in FIG. 2.
Figure 4:
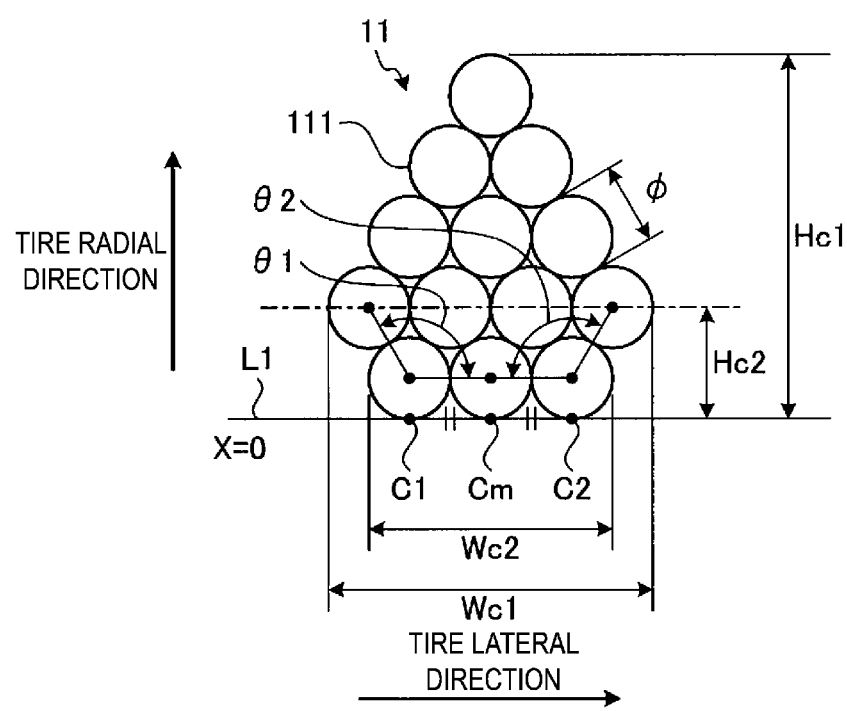
FIG. 4 is an explanatory view illustrating a wire array structure of a bead core illustrated in FIG. 3.
Figure 5:
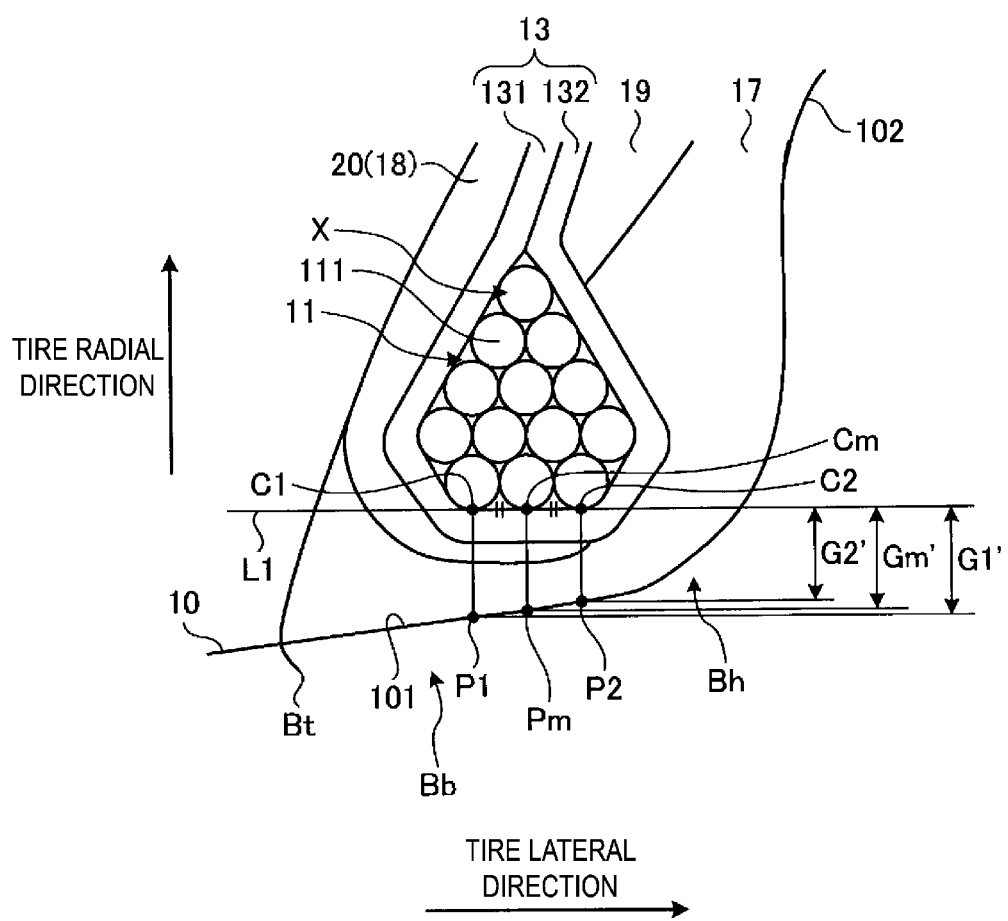
FIG. 5 is an explanatory view illustrating a rim fitting portion of a bead portion of a tire after rim assembly.

FIG. 3 is an enlarged view illustrating the rim fitting portion of the bead portion illustrated in FIG. 2. FIG. 4 is an explanatory view illustrating the wire array structure of the bead core illustrated in FIG. 3. FIG. 5 is an explanatory view illustrating the rim fitting portion of the bead portion of the tire after rim assembly. Among these figures, FIG. 3 illustrates the rim fitting portion before rim assembly, and FIG. 5 illustrates the rim fitting portion after rim assembly. FIG. 4 is a cross-sectional view of the unvulcanized bead core 11 in the radial direction as a single component.

In FIG. 2, the rim fitting face of the bead portion includes the bead base Bb, the bead toe Bt, and the bead heel Bh, and has a uniform contour in the tire circumferential direction. The bead base Bb is a flat region formed on the inner side of the bead portion in the tire radial direction, and constitutes a contact face with the bead seat 101 of the rim. The bead toe Bt is a tip of the bead portion having an L-shape or a V-shape in a cross-sectional view in the tire meridian direction, and is located on the innermost side of the rim fitting face in the tire lateral direction. The bead heel Bh is a bent portion that connects a wall face of the tire side portion to the bead base Bb.

The state of the tire before rim assembly (see FIGS. 2 and 3) is defined as a state in which the tire is fixed to the rim such that positions of the left and right bead portions match measurement points of the rim width and rim diameter of the specified rim, with the tire rotation shaft horizontal and the tire itself upright. Such a tire shape is closest to the tire shape in a tire vulcanization mold, that is, the natural tire shape before inflation.

Also, the state of the tire after rim assembly (see FIG. 5) is defined as a state in which the tire is mounted on the specified rim, inflated to the specified internal pressure, and in the unloaded state. In the state of the tire after rim assembly, the rim fitting face of the bead portion fits into the rim 10 of the wheel, thereby holding the tire. In this case, the bead base Bb of the rim fitting face is pressed against the bead seat 101 of the rim 10 and brought into surface-contact therewith, thereby sealing the fitting portion between the bead portion and the rim 10 to ensure the air tightness inside the tire. Additionally, the bead heel Bh is located at the connection portion between the bead seat 101 and the flange 102, and an outer region of the rim fitting face than the bead heel Bh abuts the flange 102 of the rim 10, to hold the bead portion from the outer side in the tire lateral direction.

As illustrated in FIG. 4, the bead core 11 has a predetermined wire array structure obtained by arranging the wire cross-sections of the bead wires 111, in a cross-sectional view in the tire meridian direction. The wire array structure will be described below.

Here, a tangent line L1 that contacts, from a side of the rim fitting face, the innermost layer of the bead core 11 in the tire radial direction and the innermost and outermost wire cross-sections in the tire lateral direction in the wire array structure, in a cross-sectional view of the tire before rim assembly in the tire meridian direction (see FIG. 3) is defined. Contact points C1 and C2 of the tangent line L1 for the wire cross-sections, and a middle point Cm of the contact points C1, C2 are defined. Gauges G1, G2, and Gm from the contact points C1, C2 and the middle point Cm to the rim fitting face in the tire radial direction are also defined. Specifically, in a cross-sectional view in the tire meridian direction, intersection points P1, P2, and Pm of straight lines that pass the contact points C1, C2 and the middle point Cm and the bead base Bb are plotted, and distances between the contact points C1, C2 and the middle point Cm and the intersection points P1, P2, and Pm, respectively, are measured as the gauges G1, G2, and Gm.

Similarly, gauges G1', G2', and Gm' of the rim fitting portion in the state of the tire after rim assembly (see FIG. 5) is defined.

In this case, change rates ΔG1, ΔG2, and ΔGm of the gauges G1, G2, and Gm of the rim fitting portion before and after rim assembly are preferably in a range of 10% to 60%, more preferably in a range of 15% to 50%, even more preferably in a range of 20% to 45%, and most preferably in a range of 25% to 40%. Thus, the change rates ΔG1, ΔG2, and ΔGm of the gauges G1, G2, and Gm are set to be larger as compared to the typical tire construction having a large rubber occupancy ratio in the closed region X (in particular, the tire constructions with bead filler having the same cross-sectional area of the bead core or more). As a result, the change rates ΔG1, ΔG2, and ΔGm of the rim fitting portion are made appropriate. That is, the above-mentioned lower limit ensures the rim fitting pressure to ensure the rim fittability of the tire. Additionally, the above-mentioned upper limit suppresses the degradation of the tire rim assembling workability due to an excessive rim fitting pressure.

The change rate ΔGi is defined as ΔGi=(Gi−Gi')/Gi×100 using the gauges Gi and Gi' before and after rim assembly at a given measurement point. For example, the change rate ΔG1 is calculated as ΔG1=(G1−G1')/G1×100 using the gauge G1 before rim assembly G1 (see FIG. 3) and the gauge G1' after rim assembly (see FIG. 5).

The above-mentioned change rates ΔG1, ΔG2, and ΔGm of the rim fitting portion are realized by, for example, the configuration of the cushion rubber layer 20 (see FIG. 6) and the configuration of the taper angle of the bead base Bb (see FIG. 7) as described below.

In addition, the change rates ΔG1, ΔG2, and ΔGm of the rim fitting portion preferably satisfy a condition |ΔGm−ΔG2|<|ΔG1−ΔGm|. Accordingly, the difference between the change rate |ΔG1−ΔGm| on the side of the bead toe Bt is set to be larger than the difference between the change rate |ΔGm−ΔG2| on the side of the bead heel Bh. Specifically, the change rates ΔG1, ΔG2, and ΔGm satisfy a relation 20%≤|(ΔG1−ΔGm)/(ΔGm−ΔG2)|≤450%, and more preferably 30%≤|(ΔG1−ΔGm)/(ΔGm−ΔG2)|≤300%. As a result, the relationship between the change rates ΔG1, ΔG2, and ΔGm of the rim fitting portion is made appropriate. That is, the above-mentioned lower limit improves the rim fittability of the tire. Additionally, the above-mentioned upper limit improves the rim assembling workability of the tire.

In addition, the change rates ΔG1, ΔG2, and ΔGm of the gauges G1, G2, and Gm of the rim fitting portion preferably have a relationship ΔG2<ΔGm<ΔG1. In other words, the change rates ΔG1, ΔG2, and ΔGm increase toward the bead toe Bt. As a result, the rim fittability of the tire is improved.

Additionally, in the configuration illustrated in FIG. 3, the gauges G1, G2, and Gm of the rim fitting portion of the tire in the state before rim assembly have a relationship G2<Gm<G1. In other words, the gauges G1, G2, and Gm of the rim fitting portion increase toward the bead toe Bt. As a result, the relationship between the change rates ΔG1, ΔG2, and ΔGm is made appropriate. Additionally, in a tire for a passenger car, the gauge G1 is preferably in a range of G1≤8.0 mm, and more preferably in the range of G1≤6.0 mm. In addition, the gauge G2 is preferably in a range of 1.0 mm≤G2, and more preferably in a range 2.0 mm≤G2. As a result, the rubber volume of the rim fitting portion on the inner side of the bead core 11 in the radial direction is made appropriate.

Additionally, a width Wc2 (mm) of the innermost layer of the bead core 11 in the wire array structure (see FIG. 4), the change rate ΔGm % of the middle point Cm, and the tire inner diameter RD inch (see FIG. 2) preferably have a relationship 1.0 (%·mm/inch)≤Wc2×ΔGm/RD≤50 (%·mm/inch), more preferably a relationship 2.0 (%·mm/inch)≤Wc2×ΔGm/RD≤40 (%·mm/inch), and more preferably a relationship 5.0 (%·mm/inch)≤Wc2×ΔGm/RD<30 (%·mm/inch). As a result, the relationship between the width Wc2 of the innermost layer of the bead core 11 and the change rate ΔGm is made appropriate. That is, the above-mentioned lower limit ensures the rim fittability of the tire. Additionally, the above-mentioned upper limit improves the rim assembling workability of the tire.

As illustrated in FIG. 4, the width Wc2 of the innermost layer of the wire array structure is measured as the maximum width including the innermost and outermost wire cross-sections in the tire lateral direction.

In addition, the width Wc2 of the innermost layer in the wire array structure is preferably in a range of 3.0 mm≤Wc2≤10.0 mm, and more preferably in a range of 4.5 mm≤Wc2≤9.6 mm.

Wire Array Structure of Bead Core

As illustrated in FIG. 4, the bead core 11 is formed by winding bead wires 111 in a ring-like and multiple manner, and has a predetermined wire array structure, in a cross-sectional view in the tire meridian direction. The wire array structure is defined by the arrangement of wire cross-sections of the bead wires 111. Additionally, the wire array structure is constituted of a plurality of layers laminated in the tire radial direction, and these layers are formed of a plurality of wire cross-sections aligned in a row in the tire lateral direction. Moreover, the innermost layer of the wire array structure is substantially parallel to the rim fitting face of the bead portion, and is opposed to the bead seat 101 of the rim 10 while the tire fits into the rim (see FIG. 3).

In the manufacturing process of the bead core 11, a core molding jig (not illustrated) is used, and one or more bead wires 111 are wound around the core molding jig in a predetermined wire array structure to form the unvulcanized bead core 11. Then, the molded bead core 11 is pre-vulcanized before a vulcanization molding step of a green tire. Note that, no such limitation is intended, and the pre-vulcanization of the bead core 11 may be omitted, and the unvulcanized bead core 11 may be incorporated into the green tire to perform the vulcanization molding step of the green tire.

Additionally, the bead wire 111 includes a wire strand and an insulation rubber that covers the wire strand (not illustrated). Additionally, the strand is made of steel. Additionally, the insulation rubber preferably consists of a rubber composition having a Mooney viscosity of 70 (M) or more. The Mooney viscosity is calculated in accordance with JIS K6300-1: 2013.

Here, in the configuration illustrated in FIG. 2, as described above, the turned-back portion 132 of the carcass layer 13 contacts the body portion 131 of the carcass layer 13 to form the closed region X that surrounds the bead core 11. In addition, the rubber occupancy ratio in the closed region X is set to be small, reducing the weight of the bead portion. In this case, in order to improve the durability of the bead portion, the generation of the cavity in the closed region X is preferably suppressed.

Thus, as illustrated in FIG. 4, the wire array structure of the bead core 11 has a wedge shape that protrudes toward the outer side in the tire radial direction. Specifically, a layer in which the number of the wire cross-sections in the wire array structure is largest (in FIG. 4, the second layer from the innermost layer) is defined as the maximum array layer. In this case, the number of layers of wire cross-section on the outer side of the maximum array layer in the tire radial direction (3 in FIG. 4) is larger than the number of layers of wire cross-section on the inner side of the maximum array layer in the tire radial direction (1 in FIG. 4). Additionally, the number of the wire cross-sections in each layer on the outer side of the maximum array layer in the tire radial direction monotonically decreases from the maximum array layer toward the outer side in the tire radial direction. Further, the number of layers of wire cross-section is preferably in a range of 4 to 6. Preferably, the number of the wire cross-sections in the maximum array layer of the wire array structure is 4 or 5, and the number of the wire cross-sections in the outermost layer in the tire radial direction is 1 or 2.

Also, the wire cross-sections are arranged in a closest-packed structure in the region on the outer side of the maximum array layer in the tire radial direction. The "closest-packed structure" refers to the state in which centers of three adjacent wire cross-sections form a substantially regular triangle in a cross-sectional view in the tire meridian direction. In such a closest-packed structure, as compared to the grid array structure in which rows of wire cross-sections are orthogonal to each other longitudinally and latitudinally, the array density of the wire cross-sections of the bead core 11 increases, improving core breakage resistance of the bead core 11. Note that, in the above-mentioned closest-packed state, all sets of adjacent wire cross-sections need not contact with each other, and some sets may be spaced with a small gap (not illustrated).

In a configuration, such as illustrated in FIG. 3, the body portion 131 and the turned-back portion 132 of the carcass layer 13 extend toward the outside in the tire radial direction along the wedge-shape of the wire array structure while abutting the left and right side faces of the bead core 11 in the tire lateral direction, and merge into the Y-shape and come into contact with each other. As a result, a gap between the merging portion of the body portion 131 and the turned-back portion 132 of the carcass layer 13, and a top portion (so-called bead top) on the outer side of the bead core 11 in the tire radial direction becomes smaller, to improve the durability of the bead portion. In particular, the above-mentioned structure including no bead filler can advantageously decrease the rubber occupancy ratio in the closed region X. In addition, since the turned-back portion 132 can bend with an obtuse angle at the merging position with the body portion 131, the amount of bending of the turned-back portion 132 is reduced, improving the durability of the bead portion.

Also, the number of the wire cross-sections in the innermost layer in the tire radial direction in the wire array structure is 3 or 4, and is preferably the same or smaller than the number of the wire cross-sections in the maximum array layer.

Additionally, as illustrated in FIG. 4, array angles θ1, θ2 at corner portions of the wire cross-section on the inner side in the tire radial direction, and on the inner side and the outer side in the tire lateral direction in the wire array structure are defined. The array angles θ1, θ2 are in a range of $80° \leq θ1$ and $80° \leq θ2$. That is, the array angles θ1, θ2 of the wire cross-section each are a substantially right or obtuse angle. In addition, as illustrated in FIG. 4, the array angles θ1, θ2 of the wire cross-sections are preferably in a range of $100° \leq θ1 \leq 150°$ and $100° \leq θ2 \leq 150°$. As a result, the disruption of the wire array structure during tire vulcanization is suppressed, thereby improving the rim fittability of the tire and the durability of the bead portion. Also, when the array angles θ1, θ2 of the wire cross-sections each are an obtuse angle, the carcass ply can be turned back along the corner portion of bead core 11 on the inner side in the tire radial direction, the rubber occupancy ratio in the closed region X can be reduced to further reduce the weight of the bead portion.

The array angles θ1, θ2 each are measured as an angle formed by a line connecting the centers of the three wire cross-sections, which constitutes the corner portion in the wire array structure.

Additionally, in FIG. 4, a maximum width Wc1 and a maximum height Hc1 of the bead core 11, and a total cross-sectional area S of the bead wires 111 of the bead core 11 preferably have a relationship $1.20 \leq Wc1 \times Hc1/S \leq 5.00$, more preferably a relationship $1.50 \leq Wc1 \times Hc1/S \leq 4.50$, and still more preferably a relationship $1.80 < Wc1 \times Hc1/S \leq 4.00$. As a result, the wire array structure of the bead core 11 is made appropriate. That is, with the above-mentioned lower limit ensures the number of the wire cross-sections and the rim fittability of the tire. In addition, the above-mentioned upper limit reduces the weight of the bead core 11.

Note that the total cross-sectional area S of the bead wires does not include the cross-sectional area of the insulation rubber.

Further, the total cross-sectional area S of the bead wires 111 is preferably in a range of 5 (mm$^2$)$\leq S \leq$35 (mm$^2$), more preferably in a range of 6 (mm$^2$)$\leq S \leq$32 (mm$^2$), and even more preferably in a range of 7 (mm$^2$)$\leq S \leq$28 (mm$^2$). As a result, the total cross-sectional area S of the bead wires 111 is made appropriate. Specifically, the above-mentioned lower limit ensures the total cross-sectional area S of the bead wires 111 to ensure the rim fittability of the tire. In addition, the above-mentioned upper limit reduces the weight of the bead core 11.

In addition, the outer diameter φ of the bead wire 111 (see FIG. 4) is preferably in a range of 0.8 mm$\leq φ \leq$1.5 mm, more preferably in a range of 0.9 mm$\leq φ \leq$1.4 mm, and still more preferably in a range of 1.0 mm$\leq φ \leq$1.3 mm. As a result, the outer diameter φ of the bead wire 111 is made appropriate. Specifically, the above-mentioned lower limit ensures the outer diameter φ of the bead wire 111 to ensure the rim fittability of the tire. In addition, the above-mentioned upper limit reduces the weight of the bead core 11.

Additionally, in FIG. 4, a height Hc2 from the tangent line L1 of the innermost layer in the wire array structure to the maximum width position of the bead core 11, and the maximum height Hc1 of the bead core 11 preferably have a relationship $1.10 \leq (Hc1-Hc2)/Hc2 \leq 2.80$, more preferably a relationship $1.30 \leq (Hc1-Hc2)/Hc2 \leq 2.50$, and still more preferably a relationship $1.50 \leq (Hc1-Hc2)/Hc2 \leq 2.30$. As a result, the wire array structure of the bead core 11 is made appropriate.

The maximum height Hc1 of the bead core is measured as the maximum height of the bead core relative to the tangent line L1.

The height Hc2 of the maximum width position of the bead core is measured as a distance between the tangent line L1 and an imaginary line connecting the centers of the wire cross-sections that constitute the maximum array layer. In the configuration in which the wire array structure includes a plurality of maximum array layers, the height Hc2 of the maximum width position is measured using the maximum array layer on the outermost side in the tire radial direction.

For example, in the configuration illustrated in FIG. 4, the number of layers of wire cross-section is 5, and the number of the wire cross-sections is set to 3-4-3-2-1 in order from the innermost layer in the tire radial direction. Thus, the number of the wire cross-sections in the maximum array layer is 4. Additionally, the number of layers of wire cross-section on the outer side of the maximum array layer in the tire radial direction is 3, and the number of layers of wire cross-section on the inner side of the maximum array layer in the tire radial direction is 1. Accordingly, the maximum array layer is asymmetric in the tire radial direction, and is biased toward the inside in the tire radial direction from the center of the wire array structure in the tire radial direction. Further, the wire array structure has a long structure on the outer side of the maximum array layer in the tire radial direction. Additionally, the number of the wire cross-sections in each layer decreases one by one from the maximum array layer toward the outer side in the tire radial direction. Also, all wire cross-sections are arranged with the closest-packed structure. Thus, the array angles θ1, θ2 of the wire cross-sections at left and right corner portions in the wire array structure in the tire radial direction each are approximately 135° (specifically, in a range of 130° to 140°). Moreover, the maximum array layer of wire cross-section is not the innermost layer in the tire radial direction. In addition, the number of the wire cross-sections in each layer increases one by one from the innermost layer to the maximum array layer. This optimizes the wire array structure.

Additionally, in FIG. 3, a distance Hg in the tire radial direction from the outer end of the bead core 11 in the tire radial direction to the contact portion between the body portion 131 and the turned-back portion 132 of the carcass layer 13, and the outer diameter φ of the bead wire 111 preferably have a relationship Hg/φ$\leq$7.0, and more preferably a relationship Hg/φ$\leq$3.0. As a result, the rigidity around the bead core 11 improves. Note that, in the case of Hg=0, the lower limit of the ratio Hg/φ is 0$\leq$Hg/φ.

Gauge of Rim Fitting Portion

Figure 6:
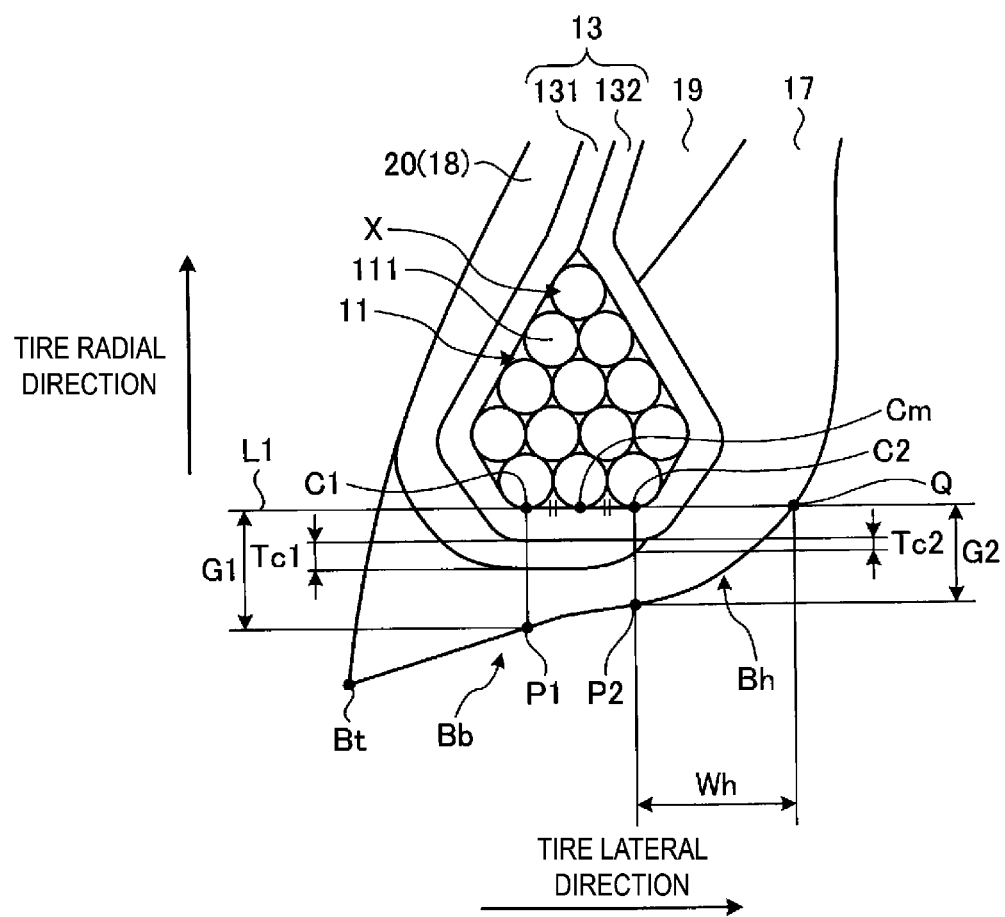
FIG. 6 is an explanatory view illustrating the rim fitting portion illustrated in FIG. 3.

FIG. 6 is an explanatory view illustrating the rim fitting portion illustrated in FIG. 3. This figure illustrates the rim fitting portion in the state before rim assembly. In this figure, the same constituents as the constituents illustrated in FIG. 3 are given the same reference signs, and explanations thereof are omitted.

In FIG. 6, as described above, the gauge G2 in the tire radial direction from the contact point C2 between the tangent line L1 on the innermost layer in the wire array structure and the outermost wire cross-section in the tire lateral direction, to the rim fitting face is defined. In this case, the gauge G2 and the outer diameter φ of the bead wire 111 (see FIG. 4) preferably have a relationship 1.3≤G2/φ≤9.5 and more preferably a relationship 1.8≤G2/φ≤5.5. As a result, the gauge G2 of the rim fitting portion is made appropriate. That is, the above-mentioned lower limit ensures the gauge G2 of the rim fitting portion to ensure the rim fittability of the tire. Additionally, the above-mentioned upper limit suppresses the degradation of the tire rim assembling workability due to an excessive gauge G2 of the rim fitting portion.

Additionally, in FIG. 6, an intersection point Q between a straight line that passes the contact point C2 of the bead core 11 and is parallel to the tire lateral direction, and an outer wall face of the rim fitting portion in the tire lateral direction is defined. Also, the gauge Wh from the contact point C2 of the bead core 11 to the point Q of the rim fitting face in the tire lateral direction is defined. In this case, the outer diameter φ of the gauge Wh and the bead wire 111 (see FIG. 4) preferably have a relationship 2.0≤Wh/φ≤15.0, and more preferably a relationship 2.5≤Wh/φ≤10.0. As a result, the gauge Wh of the rim fitting portion is made appropriate. That is, the above-mentioned lower limit ensures the gauge Wh of the rim fitting portion to ensure the rim fitting portion of the tire and the durability of the rim fitting portion. Additionally, the above-mentioned upper limit suppresses the degradation of the tire rim assembling workability due to an excessive gauge Wh of the rim fitting portion.

Additionally, as illustrated in FIG. 6, the cushion rubber layer 20 is inserted between the innermost layer of the bead core 11 and the rim cushion rubber 17. The cushion rubber layer 20 is a member having a lower rubber hardness than the rim cushion rubber 17, and includes, for example, the innerliner 18, a tie rubber (not illustrated) that adheres the innerliner 18 to the carcass layer 13, and so on, and does not include a carcass ply. Additionally, the cushion rubber layer 20 may be integrated with the innerliner 18 and the tie rubber, or may be separated from the innerliner and the tie rubber (not illustrated). Additionally, the cushion rubber layer 20 may be made of the same rubber material as the innerliner 18 and the tie rubber, or may be made of different rubber materials (not illustrated). Also, the cushion rubber layer 20 preferably traverse in the tire lateral direction in the range from the contact point C1 to middle point Cm of bead core 11, preferably from the contact point C1 to the contact point C2. In such a configuration, the cushion rubber layer 20 is interposed between the innermost layer of the bead core 11 and the rim fitting face of the bead portion, thereby increasing the change rates ΔG1, ΔG2, and ΔGm of the rim fitting portion to improve the rim fittability of the tire. Additionally, the contact pressure of the rim fitting face against the rim 10 is made uniform.

Additionally, the rubber hardness of the cushion rubber layer 20 is lower than the rubber hardness of the rim cushion rubber 17 by preferably 5 or more, and more preferably 8 or more. As a result, the effect of increasing the change rates ΔG1, ΔG2, and ΔGm of the rim fitting portion is appropriately obtained.

For example, in the configuration illustrated in FIG. 6, in a cross-sectional view in the tire meridian direction, the cushion rubber layer 20 extends from the tire cavity face toward the outer side in the tire lateral direction along the turned-back portion 132 of the carcass layer 13, and is interposed between the bead core 11 and the rim cushion rubber 17. Also, the cushion rubber layer 20 extends beyond the middle point Cm in the innermost layer of the bead core 11 to the outermost contact point C2. Additionally, an outer end of the cushion rubber layer 20 in the tire lateral direction terminates at the inner side of the tangent line L1 of the bead core 11 in the tire radial direction. Accordingly, the end of the cushion rubber layer 20 does not extend to the outer side face of the bead core 11 in the tire lateral direction. As a result, the change rates ΔG1, ΔG2, and ΔGm between the bead core 11 and the rim fitting face (in particular, the bead base Bb) is effectively increased, while the rigidity between the bead core 11 and the flange 102 of the rim 10 (see FIG. 2) is appropriately ensured. However, no such limitation is intended, and the outer end of the cushion rubber layer 20 in the tire lateral direction may extend farther to the outer side in the tire radial direction of the tangent line L1 of the bead core 11.

Additionally, in FIG. 6, the thicknesses Tc1, Tc2 of the cushion rubber layer 20 between the measurement points C1, P1; C2, P2 of the gauges G1, G2 of the rim fitting portion preferably have a relationship Tc2<Tc1. In other words, the thickness Tc1 of the cushion rubber layer 20 on the side of the bead toe Bt is preferably larger than the thickness Tc2 of the cushion rubber layer 20 on the side of the bead heel Bh. As a result, the change rate ΔG1 of the rim fitting portion on the side of the bead toe Bt is larger than the change rate ΔG2 of the rim fitting portion on the side of the bead heel Bh (ΔG2<ΔG1) to improve the rim fittability of the tire.

Additionally, as described above, the relationship of the change rates ΔG1, ΔG2, and ΔGm of the rim fitting portion can be adjusted by adjusting the relationship between the thicknesses of the cushion rubber layer 20 between the measurement points C1, P1; C2, P2; Cm, Pm of the gauges G1, G2, and Gm of the rim fitting portion.

Additionally, an average value of the thicknesses of the cushion rubber layer 20 in the region from the contact point C1 to the contact point C2 in the tire lateral direction is preferably in a range of 0.3 mm to 3.0 mm. As a result, the average thickness of the cushion rubber layer 20 is made appropriate. In other words, the effect of the cushion rubber layer 20 that increases the change rates ΔG1, ΔG2, and ΔGm of the rim fitting portion is appropriately obtained by the above-mentioned lower limit. In addition, the upper limit suppresses a decrease in the rigidity of the rim fitting portion of the tire due to an excessive amount of the cushion rubber layer 20.

Additionally, in FIG. 6, the gauge G1 of the rim fitting portion on the side of the bead toe Bt and the thickness Tc1 of the cushion rubber layer 20 preferably have a relationship 0.03≤Tc1/G1≤0.95, and more preferably a relationship 0.05≤Tc1/G1≤0.85. As a result, the average thickness of the cushion rubber layer 20 is made appropriate. That is, the above-mentioned lower limit appropriately ensures the effect of the cushion rubber layer 20, and increases the change rate ΔG1 of the rim fitting portion. Additionally, the above-mentioned upper limit ensures the gauge G1 of the rim cushion rubber 17 to appropriately ensure the rim fittability of the tire.

Additionally, on the side of the tire cavity, the cushion rubber layer 20 extends from the measurement point on the outer side of the bead core 11 in the tire radial direction with the height H1 (see FIG. 2) toward the outer side in the tire radial direction by preferably 5 mm or more.

Shape of Rim Fitting Face

Figure 7:
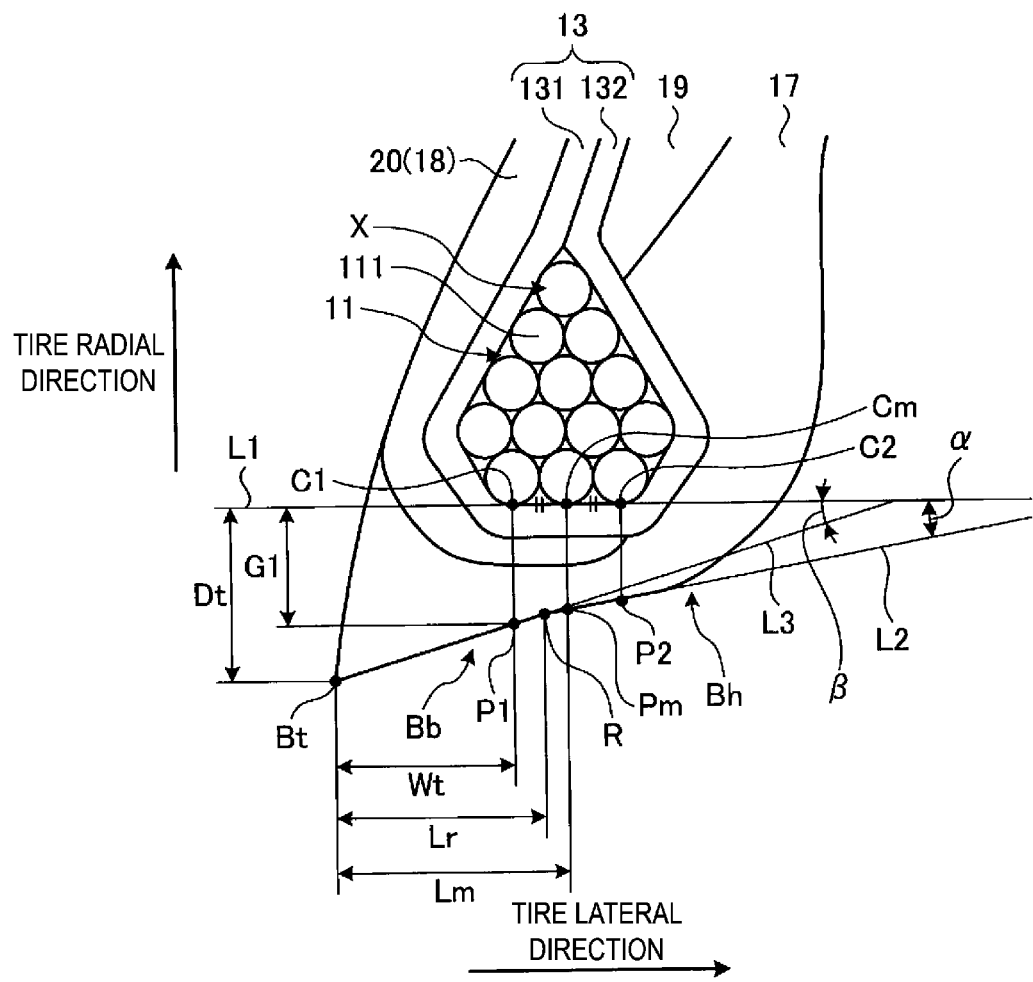
FIG. 7 is an explanatory view illustrating the rim fitting portion illustrated in FIG. 3.

FIG. 7 is an explanatory view illustrating the rim fitting portion illustrated in FIG. 3. This figure illustrates the rim fitting portion in the state before rim assembly. In this figure, the same constituents as the constituents illustrated in FIG. 3 are given the same reference signs, and explanations thereof are omitted.

As illustrated in FIG. 7, a line that is tangent to the rim fitting face at the intersection point P2 is defined as an extension line L2 of the bead base Bb, in a cross-sectional view before rim assembly in the tire meridian direction.

In this case, an inclination angle α of the extension line L2 of the bead base Bb with respect to the tangent line L1 of the bead core 11 is preferably in a range of $3° \leq \alpha \leq 15°$, and more preferably in the range of $6° \leq \alpha \leq 12°$.

Additionally, the inclination angle α° of the extension line L2 of the bead base Bb, the change rate ΔGm % of the rim fitting portion, and a tire nominal width WA (dimensionless) preferably have a relationship 0 (%·deg)$\leq \Delta Gm \times \alpha/WA \leq 7$ (%·deg), and more preferably a relationship 0.5 (%·deg) $\leq \Delta Gm \times \alpha/WA \leq 5.0$ (%·deg). As a result, the ratio ΔGm×α/WA, which indicates the rim fittability of the tire, is made appropriate. In other words, in general, as the tire nominal width WA is larger, the rim fittability of the tire is lower. Additionally, as the inclination angle α of the bead base Bb and the change rate ΔGm of the rim fitting portion are larger, the fitting pressure against the rim increases to improve the rim fittability of the tire. Therefore, the above-mentioned lower limit increases a ratio ΔGm×α/WA to improve the rim fittability of the tire. Additionally, the above-mentioned upper limit suppresses the degradation of the tire rim assembling workability due to an excessive rim fitting pressure. Note that, in the case of the inclination angle α=0°, the inclination angle is ΔGm×α/WA=0.

Additionally, as illustrated in FIG. 7, in a cross-sectional view in the tire meridian direction, when the bead base Bb has a shape formed by connecting two types of linear portions with different inclination angles to each other (so-called two-stage taper shape), an extension line L2 of the linear portion on the side of the bead heel Bh of the bead base Bb of the rim fitting face and an extension line L3 of the linear portion on the side of the bead toe Bt are defined.

In this case, inclination angles α, β of the extension lines L2 and L3 of the bead base Bb with respect to the tangent line L1 of the bead core 11 preferably have a relationship $0 \leq \beta/\alpha \leq 5.0$, and more preferably a relationship $1.8 \leq \beta/\alpha \leq 4.0$. As a result, the two-stage taper shape of the bead base Bb is made appropriate. That is, by the above-mentioned lower limit appropriately achieves the effect of improving the rim fittability of the tire due to the two-stage tapered shape. Additionally, the above-mentioned upper limit suppresses the occurrence of vulcanization failure in the bead base Bb.

Additionally, in FIG. 7, an intersection point R of the two types of linear portions of the bead base Bb is defined.

In this case, a distance Lr from the bead toe Bt to the intersection point R in the tire lateral direction and a distance Lm from the bead toe Bt to the middle point Cm in the tire lateral direction preferably have a relationship $0.50 \leq Lr/Lm \leq 4.0$, and more preferably a relationship $0.70 \leq Lr/Lm \leq 3.3$. As a result, the position of the intersection point R is made appropriate, appropriately achieving the effect of improving the rim fittability of the tire due to the two-stage tapered shape.

For example, in the configuration illustrated in FIG. 7, the array angle θ1 (see FIG. 4) of the wire cross-section at the corner portion on the inner side in the tire radial direction and on the inner side in the tire lateral direction in the wire array structure of the bead core 11 is in a range of 130° to 140°. Additionally, the two types of linear portions of the bead base Bb are connected to each other as a smooth arc that protrudes toward the outside in the tire radial direction. Also, the intersection point R is located between the contact point C1 and the middle point Cm of the bead core 11.

In FIG. 7, a distance Dt in the tire radial direction and a distance Wt in the tire lateral direction from the contact point C1 of the bead core 11 to the bead toe Bt are defined. In this case, the distances Dt, Wt and the gauge G1 from the contact point C1 to the rim fitting face in the tire radial direction preferably a relationship $7° \leq \arctan\{(Dt-G1)/Wt\} \leq 30°$, and more preferably a relationship $9° \leq \arctan\{(Dt-G1)/Wt\} \leq 25°$. As a result, a gradient of the rim fitting face from the bead core 11 to the bead toe Bt with respect to the tire axial direction is made appropriate. That is, the above-mentioned lower limit ensures the gradient of the rim fitting face to ensure the rim fittability of the tire. Additionally, the above-mentioned upper limit suppresses the decline of the tire rim assembling workability due to an excessive gradient of the rim fitting face.

The distances Dt, Wt from the contact point C1 to the bead toe Bt are measured in the state before rim assembly.

Modified Examples

FIGS. 8 to 12 are explanatory views of modified examples of the bead core illustrated in FIG. 4. These figures are cross-sectional views of the unvulcanized bead core 11 in the radial direction as a single component.

In the configuration illustrated in FIG. 4, the tangent line L1 to the innermost layer of the bead core 11 is parallel to the tire lateral direction. Therefore, an inclination angle X that the tangent line L1 forms with the tire lateral direction is X=0°.

Figure 8:
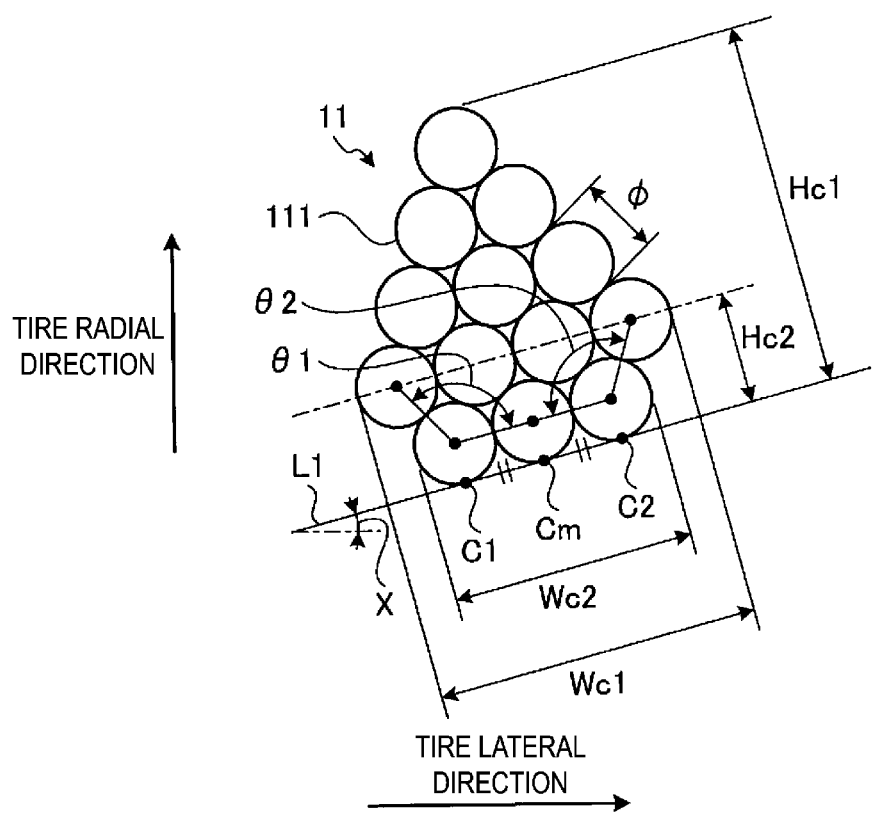
FIG. 8 is an explanatory view of a modified example of the bead core illustrated in FIG. 4.

However, no such limitation is intended, and as illustrated in FIG. 8, the bead core 11 may be inclined with respect to the tire lateral direction. Specifically, the bead core 11 may be inclined toward the inside on the side of the bead toe Bt (see FIG. 3) in the tire radial direction. In such a configuration, the tangent line L1 of the innermost layer of the bead core 11 gets closer to be parallel to the bead base Bb of the rim fitting face. In this case, the inclination angle X of the tangent line L1 with respect to the tire lateral direction is preferably in a range of $-10° \leq X \leq 30°$. Note that the range of the relative inclination angle α of the extension line L2 of the bead base Bb with respect to the tangent line L1 of the bead core 11 is as described above.

Additionally, in the configuration illustrated in FIG. 4, as described above, the number of the wire cross-sections is set to 3-4-3-2-1 in order from the innermost layer in the tire radial direction. Therefore, the number of layers of the wire cross-sections is 5, and the number of the wire cross-sections in the outermost layer in the tire radial direction is 1.

Figure 9:
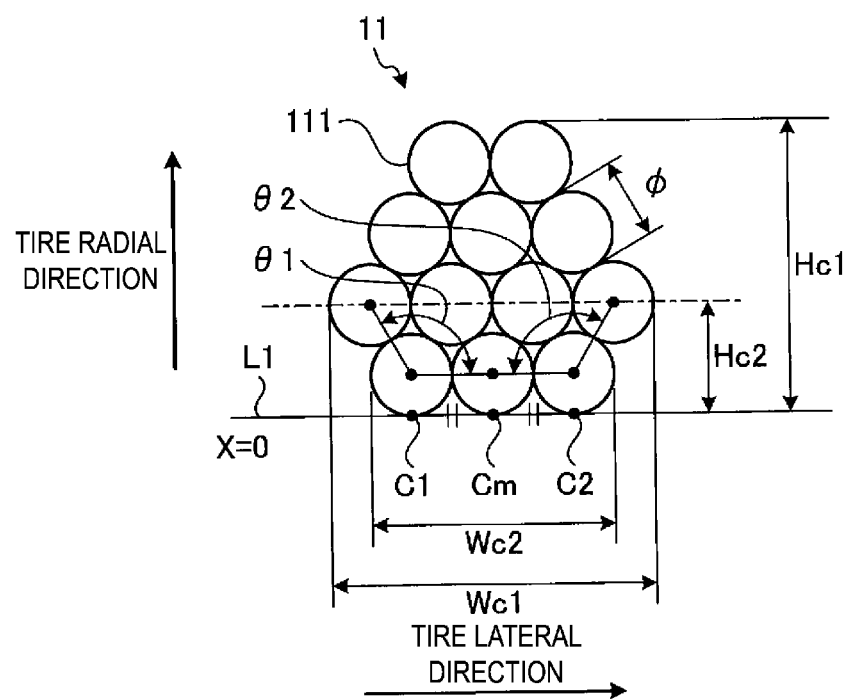
FIG. 9 is an explanatory view of a modified example of the bead core illustrated in FIG. 4.
Figure 10:
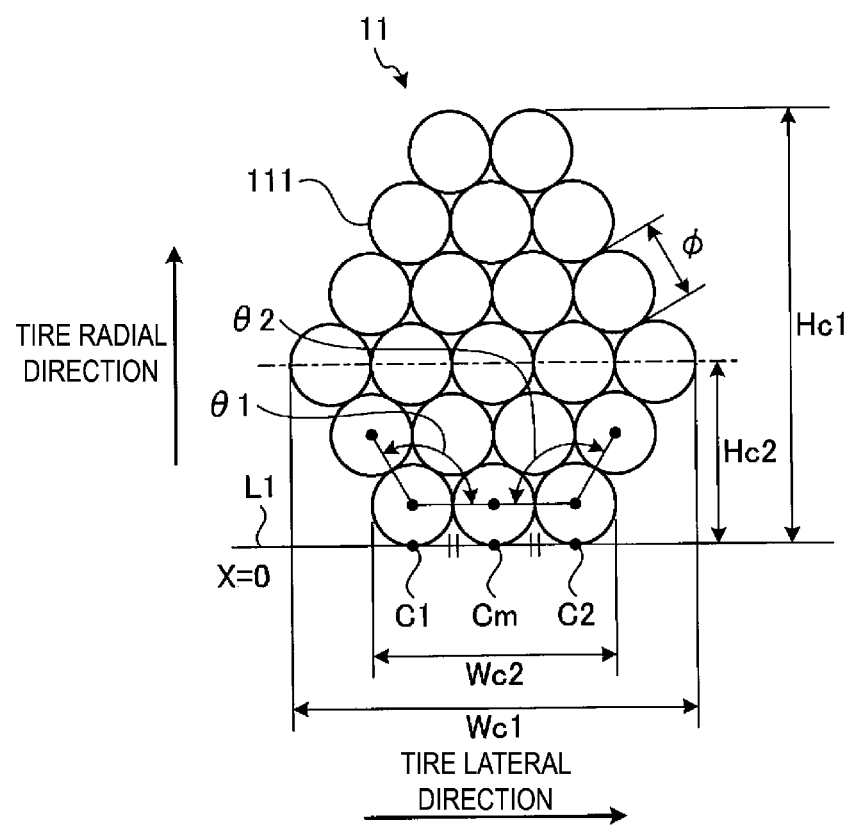
FIG. 10 is an explanatory view of a modified example of the bead core illustrated in FIG. 4.

In contrast, in the configuration illustrated in FIG. 9, the number of layers of the wire cross-sections is 4, and the number of the wire cross-sections is set to 3-4-3-2 in order from the innermost layer in the tire radial direction. In the configuration illustrated in FIG. 10, the number of layers of the wire cross-sections is 6, and the number of the wire cross-sections is set to 3-4-5-4-3-2 in order from the innermost layer in the tire radial direction. As described above, the number of layers of wire cross-section may be 4 or 6. Additionally, the number of the wire cross-sections in the outermost layer in the tire radial direction may be 2. Also in such cases, the number of layers of wire cross-sections on the outer side of the maximum array layer in the tire radial direction (2 in FIGS. 9 and 3 in FIG. 10) is larger than the number of layers of wire cross-sections on the inner side of the maximum array layer in the tire radial direction (1 in FIGS. 9 and 2 in FIG. 10). Additionally, the number of the wire cross-sections in each layer decreases one by one from the maximum array layer toward the outer side in the tire radial direction.

Additionally, in the configuration illustrated in FIG. 4, the number of the wire cross-sections in the innermost layer in the tire radial direction is smaller than the number of the wire cross-sections in the maximum array layer (the second layer from the innermost layer). Also, all wire cross-sections that constitute the wire array structure are arranged in the closest-packed structure. Therefore, the array angles θ1, θ2 of the wire cross-sections at the corner portions on the inner side in the tire radial direction and on the inner side and outer side in the tire lateral direction in the wire array structure each are in a range of 130° to 140°.

Figure 11:
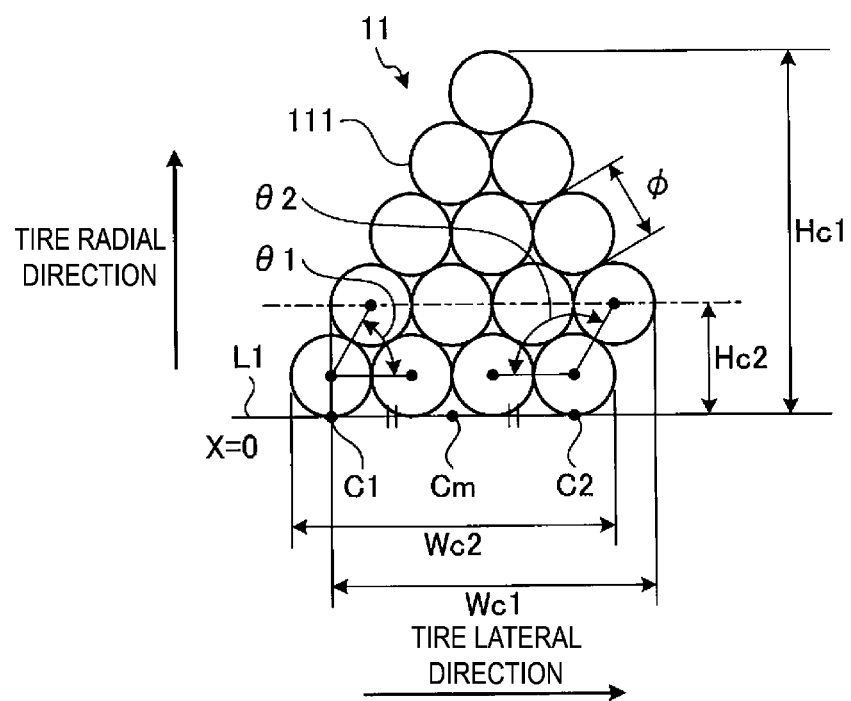
FIG. 11 is an explanatory view of a modified example of the bead core illustrated in FIG. 4.
Figure 12:
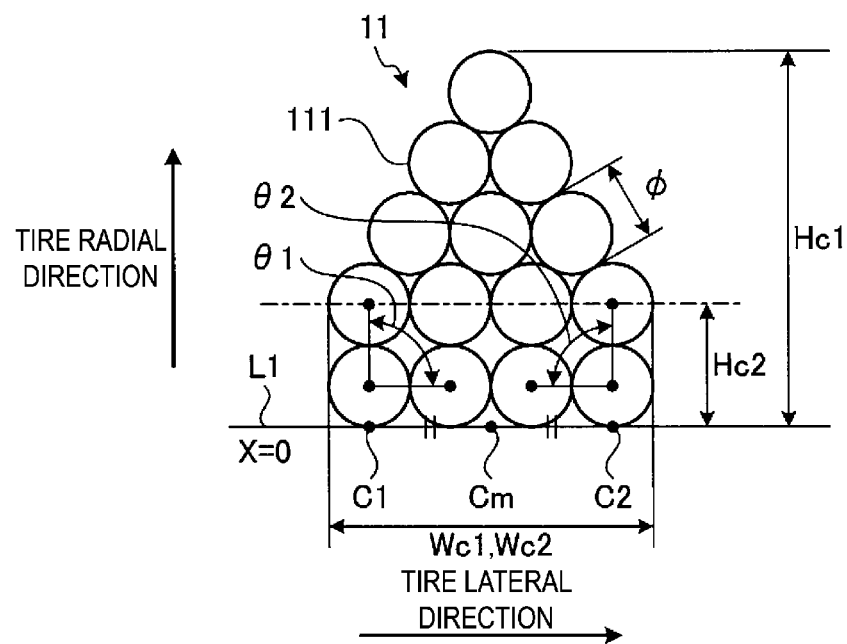
FIG. 12 is an explanatory view of a modified example of the bead core illustrated in FIG. 4.

In contrast, in the configuration illustrated in FIG. 11 and FIG. 12, the number of layers of wire cross-section is 5, and the number of the wire cross-sections is set to 4-4-3-2-1 in order from the innermost layer in the tire radial direction. Thus, the number of the wire cross-sections in the innermost layer is the same as the number of the wire cross-sections in the maximum array layer. Additionally, in the configuration illustrated in FIG. 11, the array angle θ1 of the wire cross-section at the corner portion on the inner side in the tire radial direction and on the inner side in the tire lateral direction in the wire array structure is an acute angle, and is in a range of 55° to 65°. On the other hand, the array angle θ2 of the wire cross-section at the corner portion on the outer side in the tire lateral direction is an obtuse angle, and is in a range of 130° to 140°. In addition, in the configuration illustrated in FIG. 12, the array angles θ1, θ2 of the wire cross-sections at the left and right corner portions on the inner side in the tire radial direction in the wire array structure each are a substantially right angle, and are in a range of 85° to 95°. In this manner, at least the array angle θ2 of the wire cross-section at the corner portion on the outer side in the tire lateral direction is preferably a substantially right angle or an obtuse angle. In the configuration illustrated in FIG. 12, the wire cross-sections are arranged in a lattice on the inner side in the tire radial direction from the maximum array layer. In this manner, it is sufficient that the wire cross-section be arranged with the closest-packed structure at least in each layer on the outer side of the maximum array layer in the tire radial direction.

Figure 13:
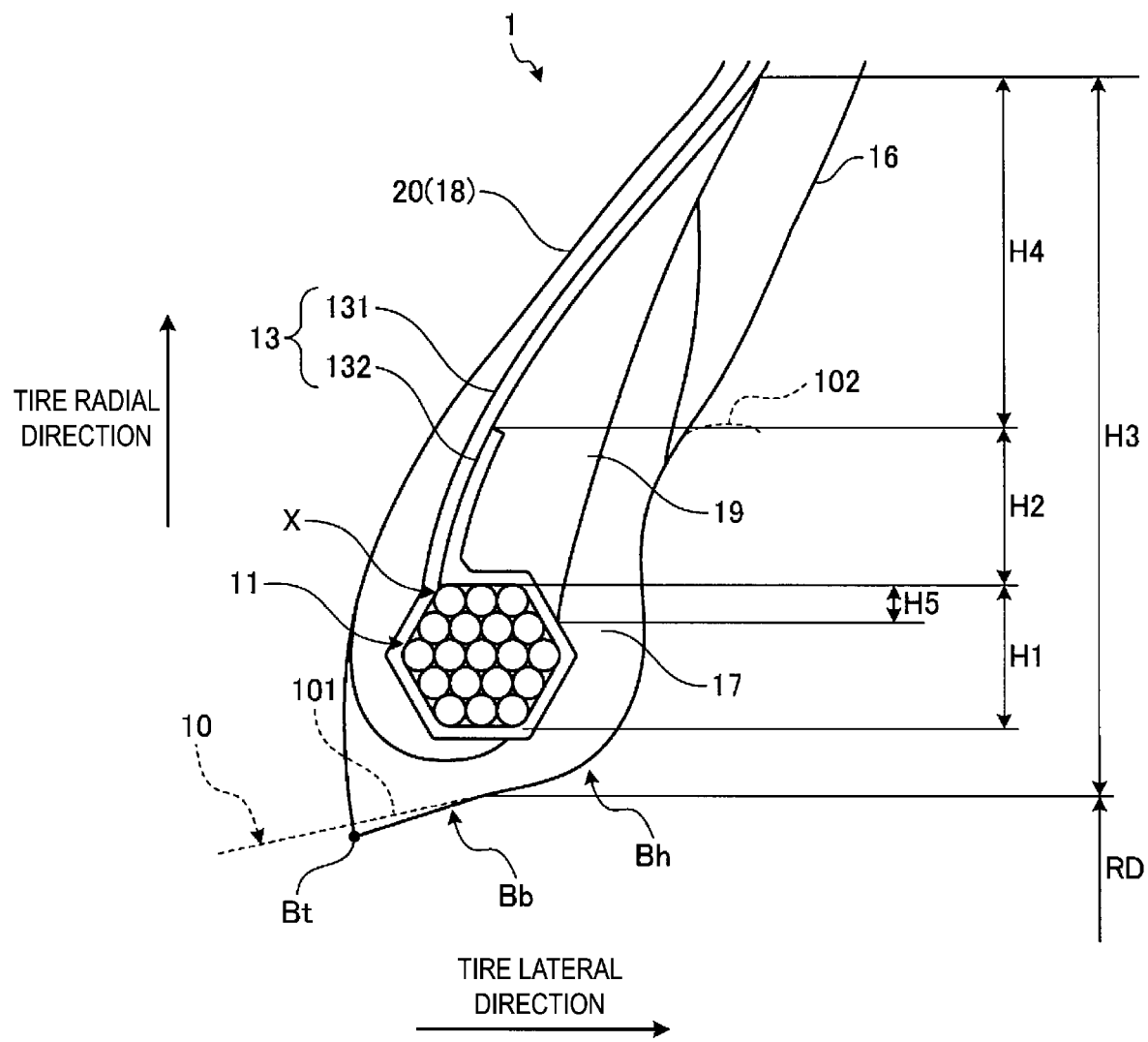
FIG. 13 is an explanatory view of a modified example of the bead portion illustrated in FIG. 2.
Figure 14:
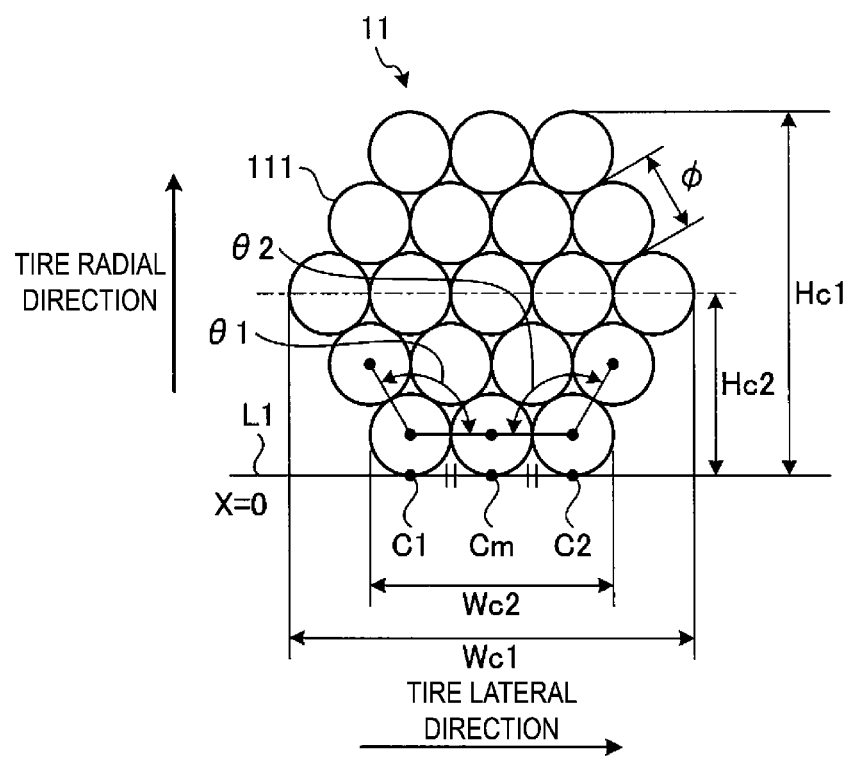
FIG. 14 is an explanatory view of a wire array structure of the bead core illustrated in FIG. 13.
Figure 15:
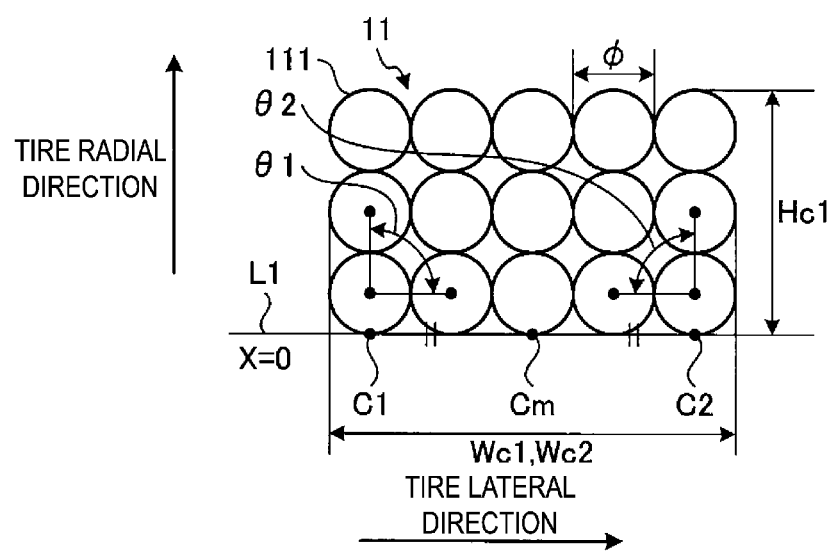
FIG. 15 is an explanatory view of a modified example of the bead core illustrated in FIG. 14.

FIG. 13 is an explanatory view of a modified example of the bead portion illustrated in FIG. 2. This figure is the cross-sectional view in the tire meridian direction illustrating the bead portion of the tire in the state before rim assembly. FIG. 14 is an explanatory view illustrating a wire array structure of the bead core 11 illustrated in FIG. 13. FIG. 15 is an explanatory view illustrating a modified example of the bead core illustrated in FIG. 14. Among these figures, FIG. 14 and FIG. 15 are cross-sectional views in the radial direction illustrating the unvulcanized bead core 11 as a single component.

In the configuration illustrated in FIG. 2, as described above, the number of the wire cross-sections is set to 3-4-3-2-1 in order from the innermost layer in the tire radial direction (see FIG. 4). As a result, the array structure of the wire cross-sections has a wedge-shape that is tapered toward the outer side in the tire radial direction.

In contrast, in the configuration illustrated in FIG. 13, as illustrated in FIG. 14, the number of layers of the wire cross-section is 5, and the number of the wire cross-sections is set to 3-4-5-4-3 in order from the innermost layer in the tire radial direction. As such, the array structure of the wire cross-section may have a hexagonal shape, and may be symmetrical with respect to the maximum array layer in a height direction.

In the configuration illustrated in FIG. 15, the number of layers of wire cross-section is 3, and the number of the wire cross-sections is set to 5-5-5 in order from the innermost layer in the tire radial direction. In this way, the array structure of the wire cross-sections may have a quadrangular shape.

Gauge of Tire Side Portion

Figure 16:
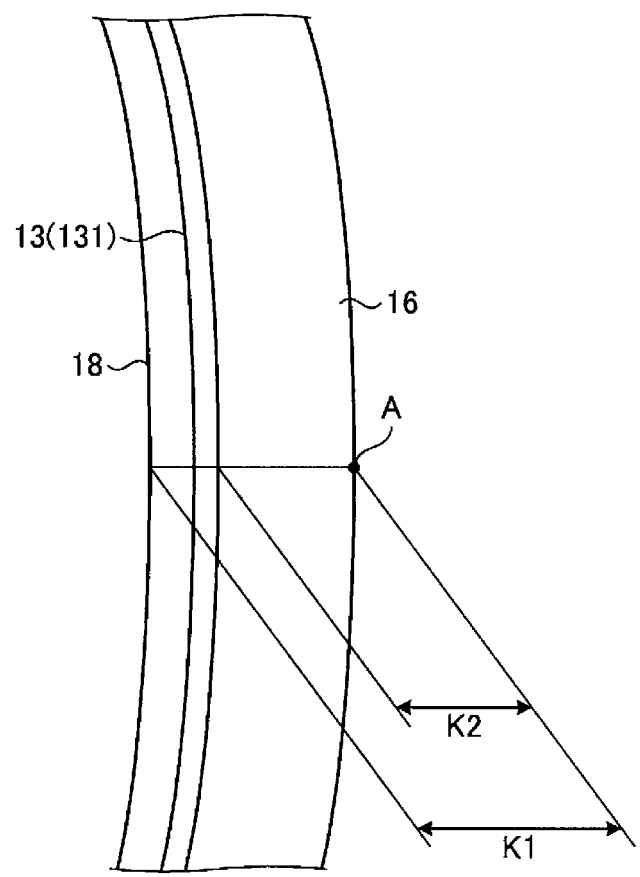
FIG. 16 is an enlarged view illustrating a tire side portion of the pneumatic tire illustrated in FIG. 1.

FIG. 16 is an enlarged view illustrating a tire side portion of the pneumatic tire illustrated in FIG. 1. This figure is an enlarged cross-sectional view in the tire meridian direction at a tire maximum width position A.

In FIG. 13, a total thickness K1 of the tire side portion at a tire maximum width position A is preferably in a range of 2.5 mm≤K1≤6.5 mm, and more preferably 3.0 mm≤K1≤6.0 mm. As a result, the total thickness K1 of the tire side portion is made appropriate. Specifically, the above-mentioned lower limit ensures the total thickness K1 of the tire side portion to ensure the rolling resistance of the tire. Also, the above-mentioned upper limit ensures weight reduction of the tire.

The total thickness K1 of the tire side portion is measured as a distance between the tire inner face and the tire outer face at the tire maximum width position A in a cross-sectional view in the tire meridian direction.

In addition, a thickness K2 of the sidewall rubber 16 at the tire maximum width position A is preferably in a range of 0.3 mm≤K2≤3.0 mm, and more preferably in a range 0.5 mm≤K2≤2.5 mm. As a result, the thickness K2 of the sidewall rubber 16 is made appropriate. Specifically, the above-mentioned lower limit ensures the thickness K2 of the sidewall rubber 16 to ensure the cut resistance of the tire side portion. Also, the above-mentioned upper limit ensures weight reduction of the tire.

Configuration with Bead Filler

Figure 17:
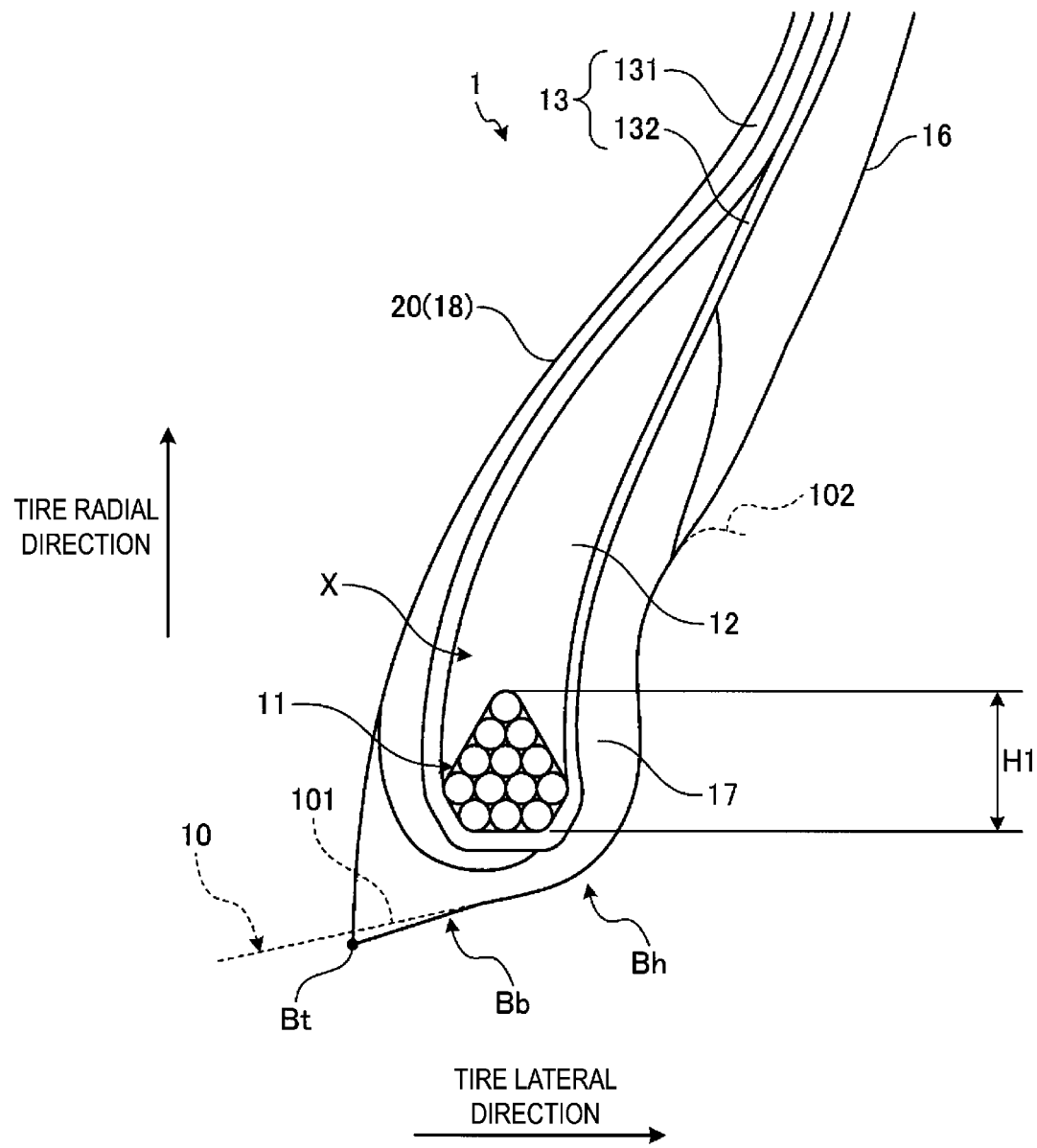
FIG. 17 is an explanatory view of a modified example of the bead portion illustrated in FIG. 2.

FIG. 17 is a cross-sectional view of a modified example of the bead portion illustrated in FIG. 2. This figure is the cross-sectional view in the tire meridian direction illustrating the bead portion of the tire in the state before rim assembly.

In the configuration illustrated in FIG. 2, as described above, the pneumatic tire 1 includes no bead filler. Specifically, the rubber occupancy ratio in the closed region X surrounded with the body portion 131 and the turned-back portion 132 of the carcass layer 13 is set to be small, thereby reducing the weight of the tire. Additionally, the outer reinforcing rubber 19 is disposed between the turned-back portion 132 of the carcass layer 13 and the rim cushion rubber 17, and reinforces the spring characteristics of the bead portion. Additionally, the turned-back portion 132 of the carcass layer 13 is locked at the body portion 131 by self-contact, and the height H2 in the tire radial direction of the self-contact portion is set to be in a predetermined range to improve the durability of the bead portion.

On the contrary, in the configuration illustrated in FIG. 17, the pneumatic tire 1 is provided with a bead filler 12. Additionally, the bead filler 12 is disposed between the body portion 131 and the turned-back portion 132 of the carcass layer 13. In addition, the turned-back portion 132 of the carcass layer 13 is locked at the body portion 131 by self-contact to form the closed region X. Therefore, the rubber occupancy ratio in the closed region X is set to be much larger than that in the configuration illustrated in FIG. 2. Additionally, because the spring characteristics of the bead portion are ensured by the bead filler 12, the outer reinforcing rubber 19 in FIG. 2 is omitted.

Effects

As described above, the pneumatic tire 1 includes the bead cores 11 formed by winding one or more bead wires 111 in a ring-like and multiple manner, the carcass layer 13 that is formed of one or more carcass plies and is turned back so as to wrap around the bead cores 11 and extend between the bead cores 11, and the rim cushion rubbers 17 disposed along the turned-back portions 132 of the carcass layer 13 to form rim fitting faces of the bead portions (see FIGS. 1 and 2). Additionally, in a cross-sectional view in the tire meridian direction, the bead core 11 has a predetermined wire array structure formed by arranging the wire cross-sections of the bead wires 111 (see FIG. 4). Also, the following are defined in the wire array structure: the tangent line L1 that contacts, from the side of the rim fitting face, the innermost layer in the tire radial direction and the wire cross-sections on the innermost side and the outermost side in the tire lateral direction; the contact points C1, C2 of the tangent line L1 with respect to the wire cross-sections on the innermost side and the outermost side; the middle point Cm of the contact points C1, C2; and the gauges G1, G2, and Gm from the contact points C1, C2 and middle point Cm, respectively, to the rim fitting face in the tire radial direction (see FIG. 3). In this case, the change rates $\Delta G1$, $\Delta G2$, and $\Delta Gm$ of the gauges G1, G2, and Gm before and after rim assembly each are in the range of 10% to 60%.

In such a configuration, the change rates $\Delta G1$, $\Delta G2$, and $\Delta Gm$ of the rim fitting portion of the bead portion is made appropriate. That is, the above-mentioned lower limit ensures the rim fitting pressure to ensure the rim fittability of the tire. This effect is particularly beneficial in the structure including no bead filler (see FIG. 2). Additionally, the above-mentioned upper limit suppresses the degradation of the tire rim assembling workability due to an excessive rim fitting pressure.

Additionally, in the pneumatic tire 1, the turned-back portion 132 of the carcass layer 13 contacts the body portion 131 of the carcass layer 13 to form the closed region X that surrounds the bead core 11 (see FIG. 2). Also, in a cross-sectional view in the tire meridian direction, the rubber occupancy ratio in the closed region X is 15% or less. In such a configuration, the rubber occupancy ratio in the closed region X surrounded with the body portion 131 and the turned-back portion 132 of the carcass layer 13, that is, the rubber volume around the bead core 11, is set to be very low. As a result, the bead filler can be omitted to reduce the weight of the tire.

In the pneumatic tire 1, the distance Dt in the tire radial direction and the distance Wt in the tire lateral direction from the contact point C1 to the bead toe Bt, and the gauge G1 from the contact point C1 to the rim fitting face in the tire radial direction have a relationship $7° \leq \arctan\{(Dt-G1)/Wt\} \leq 30°$ (see FIG. 7). As a result, advantageously, a gradient of the rim fitting face with respect to the tire axial direction from the bead core 11 to the bead toe Bt is made appropriate. That is, the above-mentioned lower limit ensures the gradient of the rim fitting face to ensure the rim fittability of the tire. Additionally, the above-mentioned upper limit suppresses the decline of the tire rim assembling workability, which is caused by an excessive gradient of the rim fitting face.

Additionally, in the pneumatic tire 1, the gauge G2 from the contact point C2 to the rim fitting face in the tire radial direction (see FIG. 3), and the outer diameter $\phi$ of the bead wire 111 (see FIG. 4) have a relationship $1.3 \leq G2/\phi \leq 9.5$. This can advantageously make the gauge G2 of the rim fitting portion appropriate. That is, the above-mentioned lower limit ensures the gauge G2 of the rim fitting portion to ensure the rim fittability of the tire. Additionally, the above-mentioned upper limit suppresses the degradation of the tire rim assembling workability due to an excessive gauge G2 of the rim fitting portion.

Additionally, in the pneumatic tire 1, the gauge Wh in the tire lateral direction from the contact point C2 to the rim fitting face (see FIG. 6), and the outer diameter $\phi$ of the bead wire 111 (see FIG. 4) have a relationship $2.0 \leq Wh/\phi \leq 15.0$. This can advantageously make the gauge Wh of the rim fitting portion appropriate. That is, the above-mentioned lower limit ensures the gauge Wh of the rim fitting portion to ensure the rim fittability of the tire. Additionally, the above-mentioned upper limit suppresses the degradation of the tire rim assembling workability, which is caused by an excessive gauge Wh of the rim fitting portion.

Additionally, in the pneumatic tire 1, the change rates of $\Delta G1$, $\Delta G2$, and $\Delta Gm$ satisfy the condition $|\Delta Gm - \Delta G2| < |\Delta G1 - \Delta Gm|$. As a result, advantageously, the relationship between the change rates $\Delta G1$, $\Delta G2$, and $\Delta Gm$ of the rim fitting portion is made appropriate to improve the rim fittability of the tire.

Additionally, in the pneumatic tire 1, the change rates $\Delta G1$, $\Delta G2$, and $\Delta Gm$ have a relationship $\Delta G2 < \Delta Gm < \Delta G1$. In such a configuration, the change rates $\Delta G1$, $\Delta G2$, and $\Delta Gm$ increase toward the bead toe Bt. This can advantageously improve the rim fittability of the tire.

Additionally, the pneumatic tire 1 is provided with the cushion rubber layer 20 that has a lower rubber hardness than the rim cushion rubber 17 and that is inserted between the innermost layer of the bead core 11 and the rim cushion rubber 17 (see FIG. 2). In such a configuration, the cushion rubber layer 20 is interposed between the bead core 11 and the rim fitting face, thereby increasing the change rates $\Delta G1$, $\Delta G2$, and $\Delta Gm$ of the rim fitting portion, and making the contact pressure of the rim fitting face against the rim 10 uniform to improve the rim fittability.

Additionally, in the pneumatic tire 1, the cushion rubber layer 20 extends at least from the contact point C1 of the bead core 11 to the middle point Cm in the tire lateral direction (see FIG. 3). As a result, advantageously, the effect of improving the rim fittability due to the cushion rubber layer 20 can be effectively obtained.

Additionally, in the pneumatic tire 1, the thicknesses Tc1, Tc2 of the cushion rubber layer 20 between the measurement points C1, P1; C2, P2 of the gauges G1, G2 of the rim fitting portion have the relationship Tc2<Tc1 (see FIG. 6). As a result, the change rate $\Delta G1$ of the rim fitting portion on the side of the bead toe Bt is larger than the change rate $\Delta G2$ of the rim fitting portion on the side of the bead heel Bh ($\Delta G2 < \Delta G1$), advantageously improving the rim fittability of the tire.

Additionally, in the pneumatic tire 1, the gauge G1 of the rim fitting portion and the thickness Tc1 of the cushion rubber layer 20 between the measurement points of the gauge G1 have the relationship $0.03 \leq Tc1/G1 \leq 0.95$ (see FIG. 6). As a result, the average thickness of the cushion rubber layer 20 is made appropriate. That is, the above-mentioned lower limit appropriately ensures the effect of the cushion rubber layer 20, and increases the change rate $\Delta G1$ of the rim fitting portion. Additionally, the above-mentioned upper limit ensures the gauge G1 of the rim cushion rubber 17 to appropriately ensure the rim fittability of the tire.

Additionally, in the pneumatic tire 1, the height Hc2 from the tangent line L1 to the maximum width position of the bead core 11 and the maximum height Hc1 of the bead core 11 have the relationship $1.10 \leq (Hc1-Hc2)/Hc2 \leq 2.80$ (see FIG. 4). As a result, the wire array structure of the bead core 11 is advantageously made appropriate.

Additionally, in the pneumatic tire 1, the array angle θ2 of the wire cross-section at the corner portion on the inner side in the tire radial direction and on the outer side in the tire lateral direction in the wire array structure is in the range $80° \leq θ2$ (see FIG. 4). As a result, disruption of the wire array structure during tire vulcanization is suppressed to advantageously improve the rim fittability of the tire.

Additionally, the pneumatic tire 1 further includes the outer reinforcing rubbers 19 each disposed between the turned-back portion 132 of the carcass layer 13 and the rim cushion rubber 17 (see FIG. 2). In such a configuration, in particular, in the above-mentioned configuration including no bead filler, the spring characteristics of the bead portions are reinforced by the outer reinforcing rubbers 19, thereby improving the steering stability on dry road faces and the durability of the bead portions.

Additionally, in the pneumatic tire 1, the layer having the largest number of the wire cross-sections in the wire array structure (the second layer from the innermost layer in FIG. 4) is defined as the maximum array layer. In this case, the number of layers of wire cross-section on the outer side of the maximum array layer in the tire radial direction (3 in FIG. 4) is larger than the number of layers of wire cross-section on the inner side of the maximum array layer in the tire radial direction (1 in FIG. 4). Additionally, the number of the wire cross-sections in each layer on the outer side of the maximum array layer in the tire radial direction monotonically decreases from the maximum array layer toward the outer side in the tire radial direction (see FIG. 4). As a result, the gap between the merging portion of the body portion 131 and the turned-back portion 132 of the carcass layer 13, and the top portion (so-called bead top) on the outer side of the bead core 11 in the tire radial direction becomes smaller, advantageously improving the durability of the bead portion. In particular, the above-mentioned structure including no bead filler can advantageously decrease the rubber occupancy ratio in the closed region X. In addition, since the turned-back portion 132 can bend with an obtuse angle at the merging position with the body portion 131, the amount of bending of the turned-back portion 132 is reduced, advantageously improving the durability of the bead portion advantage.

Example

Figure 19:
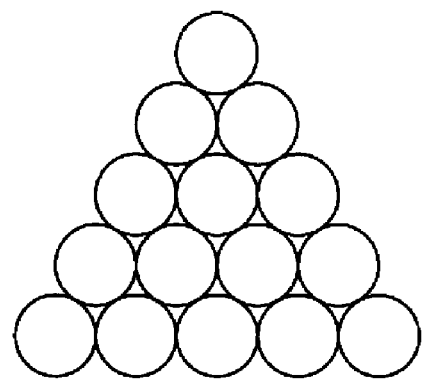
FIG. 19 is an explanatory view illustrating a bead core of a test tire in a conventional example.

FIGS. 18A-18B include a table showing results of performance tests of the pneumatic tires according to embodiments of the technology. FIG. 19 is an explanatory view illustrating a bead core of a test tire in a conventional example.

In the performance tests, a plurality of types of test tires having a tire size 205/55R16 were evaluated for (1) tire mass, and (2) rim fittability.

(1) The tire mass is calculated as an average value of the mass of five test tires having the same structure. The measurement results are expressed as index values and evaluated with the Conventional Example being assigned as the reference (100). Smaller numerical values for this evaluation indicate that the test tires are lighter, and if the index value is 99 or less, the weight of the tire can be reduced.

(2) In the evaluation for the rim fittability, the test tires were assembled on rims having a rim size of 16×6.5 J, and an air pressure of 230 (kPa) and a prescribed load of JATMA were applied to the test tires. The test tires were mounted on an SUV (Sport Utility Vehicle) having an engine displacement 2000 (cc), which was the test vehicle. Then, when the test vehicle j-turned in a predetermined traveling path while gradually decreasing the air pressure of the test tire, and air leakage occurred, the air pressure at the time was measured. The measurement results are expressed as index values and evaluated with the Conventional Example being assigned as the reference (100). In this evaluation, larger numerical values are preferable.

The test tires in Examples 1 to 13 have the structure including no bead filler (see FIGS. 1 and 2), thereby reducing the weight of the tire. Additionally, the gauges G1, Gm, and G2 of the rim fitting portion in the state before rim assembly have a relationship G2<Gm<G1.

In the test tire of in the Conventional Example, in the configuration illustrated in FIGS. 1 and 2, the bead core 11 has the wire array structure illustrated in FIG. 19, and the outer reinforcing rubber 19 is made of the same material as the material for the rim cushion rubber 17 to be integrated into the rim cushion rubber 17. In the test tires in Comparative Examples 1 and 2, in the configuration illustrated in FIGS. 1 and 2, the insulation rubber of the bead core 11 is increased to increase the rubber occupancy ratio in the closed region X.

As can be seen from the test results, in the test tires of Examples 1 to 13, the rim fittability of the tire can be improved while reducing the weight of the tire.

The invention claimed is:
1. A pneumatic tire comprising:
a bead core formed of one or more bead wires wound in a ring-like and multiple manner;
a carcass layer formed of one or more carcass plies, the carcass layer being turned back to wrap around the bead core and extending across the bead core;
a rim cushion rubber disposed along a turned-back portion of the carcass layer to constitute a rim fitting face of a bead portion; and
a cushion rubber layer having a lower rubber hardness than the rim cushion rubber, the cushion rubber layer being inserted between the innermost layer of the bead core and the rim cushion rubber, wherein
the bead core has a predetermined wire array structure formed by arranging a wire cross-section of the bead wire in a cross-sectional view in a tire meridian direction,
the following in the wire array structure are defined: a tangent line L1 that contacts, from a side of the rim fitting face, an innermost layer in a tire radial direction and innermost and outermost wire cross-sections in a tire lateral direction; contact points C1, C2 on the tangent line L1; a middle point Cm of the contact points C1, C2; and gauges G1, G2, and Gm in the tire radial direction from the contact points C1, C2 and the middle point Cm to the rim fitting face,
change rates ΔG1, ΔG2, and ΔGm of the gauges G1, G2, and Gm before and after rim assembly each are in a range of 10% to 60%,
the turned-back portion of the carcass layer contacts a body portion of the carcass layer to form a closed region that surrounds the bead core, in a cross-sectional view in the tire meridian direction,
a rubber occupancy ratio in the closed region is 15% or less,
the rubber occupancy ratio is calculated as a ratio of a cross-sectional area of a rubber material around the bead core in the closed region to an overall cross- sectional area of the closed region, in the cross-sectional view in the tire meridian direction, thicknesses Tc1, Tc2 of the cushion rubber layer between measurement points of the gauges G1, G2, respectively, satisfy a relationship Tc2<Tc1, the change rates ΔG1 and ΔG2 satisfy a relationship ΔG2<ΔG1, the gauges G1 and G2 before the rim assembly have a relationship G2<G1, in a cross-sectional view in the tire meridian direction, a bead base of the rim fitting face has a shape formed by connecting two types of linear portions with different inclination angles to each other, an extension line L2 of one of the linear portions on a side of a bead heel of the bead base and an extension line L3 of other of the linear portions on a side of a bead toe of the bead base are defined, and inclination angles α, β of the extension lines L2 and L3 of the bead base with respect to the tangent line L1 of the bead core have a relationship 1.8≤β/α≤4.0, and the inclination angle α of the extension line L2 of the bead base with respect to the tangent line L1 of the bead core is in a range of 3°≤α≤15°.

2. The pneumatic tire according to claim 1, wherein a distance Dt in the tire radial direction and a distance Wt in the tire lateral direction from the contact point C1 to a bead toe, and the gauge G1 in the tire radial direction from the contact point C1 to the rim fitting face satisfy a relationship 7°≤arctan {(Dt−G1)/Wt}≤30°.

3. The pneumatic tire according to claim 1, wherein the gauge G2 in the tire radial direction from the contact point C2 to the rim fitting face, and an outer diameter φ of the bead wire satisfy a relationship 1.3≤G2/φ≤9.5.

4. The pneumatic tire according to claim 1, wherein a gauge Wh in the tire lateral direction from the contact point C2 to the rim fitting face, and an outer diameter φ of the bead wire satisfy a relationship 2.0≤Wh/φ≤15.0.

5. The pneumatic tire according to claim 1, wherein the change rates ΔG1, ΔG2, and ΔGm satisfy a condition |ΔGm−ΔG2|<|ΔG1−ΔGm|.

6. The pneumatic tire according to claim 5, wherein the change rates ΔG1, ΔG2, and ΔGm satisfy a relationship ΔG2<ΔGm<ΔG1.

7. The pneumatic tire according to claim 1, wherein the cushion rubber layer extends at least from the contact point C1 to the middle point Cm of the bead core in the tire lateral direction.

8. The pneumatic tire according to claim 1, wherein the gauge G1 and a thickness Tc1 of the cushion rubber layer between measurement points of the gauge G1 satisfy a relationship 0.03≤Tc1/G1≤0.95.

9. The pneumatic tire according to claim 1, wherein a height Hc2 from the tangent line L1 to a maximum width position of the bead core and a maximum height Hc1 of the bead core satisfy a relationship 1.10≤(Hc1−Hc2)/Hc2≤2.80.

10. The pneumatic tire according to claim 1, wherein an array angle θ2 of the wire cross-section at a corner portion on an inner side in the tire radial direction and on an outer side in the tire lateral direction in the wire array structure is in a range of 80°≤θ2.

11. The pneumatic tire according to claim 1, further comprising an outer reinforcing rubber having a higher rubber hardness than the rim cushion rubber, the outer reinforcing rubber being disposed between the turned-back portion of the carcass layer and the rim cushion rubber.

12. The pneumatic tire according to claim 1, wherein a layer having a largest number of the wire cross-sections in the wire array structure is defined as a maximum array layer, the number of layers of wire cross-section on an outer side of the maximum array layer in the tire radial direction is larger than the number of layers of wire cross-section on an inner side of the maximum array layer in the tire radial direction, and the number of the wire cross-sections in each layer on the outer side of the maximum array layer in the tire radial direction monotonically decreases from the maximum array layer toward the outer side in the tire radial direction.

13. The pneumatic tire according to claim 1, wherein the gauge G1 from the contact point C1 and the thicknesses Tc1 between measurement points of the gauges G1 have a relationship 0.03≤Tc1/G1≤0.50.

14. The pneumatic tire according to claim 1, wherein the rim cushion rubber is disposed outward in a tire lateral direction of the bead core and forms a laterally outermost surface of the pneumatic tire configured to contact a rim.

15. The pneumatic tire according to claim 1, wherein the gauge G2 in the tire radial direction from the contact point C2 to the rim fitting face, and an outer diameter φ of the bead wire satisfy a relationship 4.0≤G2/φ≤9.5.

16. The pneumatic tire according to claim 1, wherein a gauge Wh in the tire lateral direction from the contact point C2 to the rim fitting face, and an outer diameter φ of the bead wire satisfy a relationship 8.0≤Wh/φ≤15.0.

17. The pneumatic tire according to claim 1, wherein a radial height H2 of a contact portion where the turned-back portion of the carcass layer contacts the body portion of the carcass layer satisfies a relationship 0.80≤H2/H1≤2.00 to a radial height H1 of the bead core.

18. A pneumatic tire comprising:
a bead core formed of one or more bead wires wound in a ring-like and multiple manner;
a carcass layer formed of one or more carcass plies, the carcass layer being turned back to wrap around the bead core and extending across the bead core;
a rim cushion rubber disposed along a turned-back portion of the carcass layer to constitute a rim fitting face of a bead portion; and
a cushion rubber layer having a lower rubber hardness than the rim cushion rubber, the cushion rubber layer being inserted between the innermost layer of the bead core and the rim cushion rubber, wherein
the bead core has a predetermined wire array structure formed by arranging a wire cross-section of the bead wire in a cross-sectional view in a tire meridian direction,
the following in the wire array structure are defined: a tangent line L1 that contacts, from a side of the rim fitting face, an innermost layer in a tire radial direction and innermost and outermost wire cross-sections in a tire lateral direction; contact points C1, C2 on the tangent line L1; a middle point Cm of the contact points C1, C2; and gauges G1, G2, and Gm in the tire radial direction from the contact points C1, C2 and the middle point Cm to the rim fitting face,
change rates ΔG1, ΔG2, and ΔGm of the gauges G1, G2, and Gm before and after rim assembly each are in a range of 10% to 60%, the turned-back portion of the carcass layer contacts a body portion of the carcass layer to form a closed region that surrounds the bead core, in a cross-sectional view in the tire meridian direction, a rubber occupancy ratio in the closed region is 15% or less, the rubber occupancy ratio is calculated as a ratio of a cross-sectional area of a rubber material around the bead core in the closed region to an overall cross-sectional area of the closed region, in the cross-sectional view in the tire meridian direction, thicknesses Tc1, Tc2 of the cushion rubber layer between measurement points of the gauges G1, G2, respectively, satisfy a relationship Tc2<Tc1, the change rates ΔG1, ΔG2, and ΔGm satisfy a relationship ΔG2<ΔGm<ΔG1, the gauges G1, G2 and Gm before the rim assembly have a relationship G2<Gm<G1, and a distance Dt in the tire radial direction and a distance Wt in the tire lateral direction from the contact point C1 to a bead toe, and the gauge G1 in the tire radial direction from the contact point C1 to the rim fitting face satisfy a relationship 7°≤arctan {(Dt−G1)/Wt}≤30°.

19. A pneumatic tire comprising:

a bead core formed of one or more bead wires wound in a ring-like and multiple manner;

a carcass layer formed of one or more carcass plies, the carcass layer being turned back to wrap around the bead core and extending across the bead core; and a rim cushion rubber disposed along a turned-back portion of the carcass layer to constitute a rim fitting face of a bead portion; wherein the bead core has a predetermined wire array structure formed by arranging a wire cross-section of the bead wire in a cross-sectional view in a tire meridian direction, the following in the wire array structure are defined: a tangent line L1 that contacts, from a side of the rim fitting face, an innermost layer in a tire radial direction and innermost and outermost wire cross-sections in a tire lateral direction; contact points C1, C2 on the tangent line L1; a middle point Cm of the contact points C1, C2; and gauges G1, G2, and Gm in the tire radial direction from the contact points C1, C2 and the middle point Cm to the rim fitting face, change rates ΔG1, ΔG2, and ΔGm of the gauges G1, G2, and Gm before and after rim assembly each are in a range of 10% to 60%, the turned-back portion of the carcass layer contacts a body portion of the carcass layer to form a closed region that surrounds the bead core, in a cross-sectional view in the tire meridian direction, a rubber occupancy ratio in the closed region is 15% or less, the rubber occupancy ratio is calculated as a ratio of a cross-sectional area of a rubber material around the bead core in the closed region to an overall cross-sectional area of the closed region, in the cross-sectional view in the tire meridian direction, the change rates ΔG1 and ΔG2 satisfy a relationship ΔG2<ΔG1, the gauges G1 and G2 before the rim assembly have a relationship G2<G1, in a cross-sectional view in the tire meridian direction, a bead base of the rim fitting face has a shape formed by connecting two types of linear portions with different inclination angles to each other, an extension line L2 of one of the linear portions on a side of a bead heel of the bead base and an extension line L3 of other of the linear portions on a side of a bead toe of the bead base are defined, inclination angles α, β of the extension lines L2 and L3 of the bead base with respect to the tangent line L1 of the bead core have a relationship 1.8≤β/α≤4.0, the inclination angle α of the extension line L2 of the bead base with respect to the tangent line L1 of the bead core is in a range of 3°≤α≤15°, and a distance Dt in the tire radial direction and a distance Wt in the tire lateral direction from the contact point C1 to a bead toe, and the gauge G1 in the tire radial direction from the contact point C1 to the rim fitting face satisfy a relationship 7°≤arctan {(Dt−G1)/Wt}≤30°.

* * * * *